(12) United States Patent
Lu et al.

(10) Patent No.: US 7,688,191 B2
(45) Date of Patent: *Mar. 30, 2010

(54) WHEEL LIFTED AND GROUNDED IDENTIFICATION FOR AN AUTOMOTIVE VEHICLE

(75) Inventors: Jianbo Lu, Livonia, MI (US); Michael Edward Brewer, Royal Oak, MI (US); Todd Allen Brown, Dearborn, MI (US); Joseph Carr Meyers, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/020,548

(22) Filed: Jan. 27, 2008

(65) Prior Publication Data

US 2009/0037050 A1     Feb. 5, 2009

Related U.S. Application Data

(60) Division of application No. 11/461,007, filed on Jul. 31, 2006, now Pat. No. 7,323,976, which is a continuation of application No. 10/608,909, filed on Jun. 27, 2003, now Pat. No. 7,109,856, and a continuation-in-part of application No. 10/308,364, filed on Jan. 4, 2002, now Pat. No. 6,593,849, which is a continuation-in-part of application No. 09/669,513, filed on Sep. 25, 2000, now Pat. No. 6,356,188.

(60) Provisional application No. 60/400,375, filed on Aug. 1, 2002, provisional application No. 60/400,261, filed on Aug. 1, 2002, provisional application No. 60/400,172, filed on Aug. 1, 2002, provisional application No. 60/400,376, filed on Aug. 1, 2002, provisional application No. 60/400,156, filed on Aug. 1, 2002, provisional application No. 60/400,155, filed on Aug. 1, 2002, provisional application No. 60/401,418, filed on Aug. 5, 2002.

(51) Int. Cl.
    *B60C 23/00*  (2006.01)

(52) U.S. Cl. .................... 340/446; 340/438; 340/440; 340/441; 340/465; 701/36; 701/38; 701/40; 701/41; 701/42; 701/45

(58) Field of Classification Search ................ 340/446, 340/438, 440, 441, 465; 701/36, 38, 40, 701/41, 42, 45
See application file for complete search history.

(56) References Cited

U.S. PATENT DOCUMENTS

| | | | | |
|---|---|---|---|---|
| 4,976,330 A * | 12/1990 | Matsumoto | ................. | 180/197 |
| 5,555,499 A * | 9/1996 | Yamashita et al. | ............. | 701/84 |
| 6,169,946 B1 * | 1/2001 | Griessbach | ................ | 701/45 |
| 6,397,127 B1 * | 5/2002 | Meyers et al. | ................. | 701/1 |
| 7,323,976 B2 * | 1/2008 | Lu et al. | .................... | 340/446 |

* cited by examiner

*Primary Examiner*—Tai T Nguyen
(74) *Attorney, Agent, or Firm*—Angela M. Bruneth; Fredrick Owens

(57) ABSTRACT

A control system (18) for an automotive vehicle (10) has a first roll condition detector (64A), a second roll condition detector (64B), a third roll condition detector (64C), and a controller (26) that uses the roll condition generated by the roll condition detectors (64A-C) to determine a wheel lift condition. Other roll condition detectors may also be used in the wheel lift determination. The wheel lift conditions may be active or passive or both.

8 Claims, 14 Drawing Sheets

ND GROUNDED
WHEEL LIFTED AND GROUNDED IDENTIFICATION FOR AN AUTOMOTIVE VEHICLE

RELATED APPLICATIONS

The present invention is a divisional of U.S. patent application Ser. No. 11/461,007, filed on Jul. 31, 2006, now U.S. Pat. No. 7,323,976 entitled "Wheel Lifted and Grounded Identification For An Automotive Vehicle," which is a continuation application of U.S. patent application Ser. No. 10/608,909, filed on Jun. 27, 2003, now U.S. Pat. No. 7,109,856 entitled "Wheel Lift Identification for an Automotive Vehicle", which claims priority to U.S. provisional patent applications Nos. 60/400,375, 60/400,261, 60/400,172, 60/400,376, 60/400,156, and 60/400,155, all filed on Aug. 1, 2002, and 60/401,418 filed on Aug. 5, 2002. U.S. patent application Ser. No. 10/608,909 is a continuation-in-part of U.S. patent application Ser. No. 10/038,364, filed Jan. 4, 2002, now U.S. Pat. No. 6,593,849 entitled "Wheel Lift Identification For An Automotive Vehicle", which is a continuation-in-part of U.S. patent application Ser. No. 09/669,513, filed Sep. 25, 2000, now U.S. Pat. No. 6,356,188 entitled "Wheel Lift Identification For An Automotive Vehicle", each of which are hereby incorporated by reference herein, as well as U.S. patent application Ser. Nos. 10/608,908, 10/609,448, and 10/609,447, filed simultaneously with U.S. patent application Ser. No. 10/608,909.

TECHNICAL FIELD

The present embodiment relates generally to a control apparatus for controlling a system of an automotive vehicle in response to sensed dynamic behavior, and more specifically, to a method and apparatus for determining whether a wheel of an automotive vehicle has lifted from the pavement using passive wheel lift detection.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address rollover (wheels lifting) of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle rollover control, it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

During a potential vehicular rollover event, wheels on one side of the vehicle start lifting, and the roll center of the vehicle shifts to the contact patch of the remaining tires. This shifted roll center increases the roll moment of inertia of the vehicle, and hence reduces the roll acceleration of the vehicle.

However, the roll attitude could still increase rapidly. The corresponding roll motion when the vehicle starts side lifting deviates from the roll motion during normal driving conditions.

When the wheels start to lift from the pavement, it is desirable to confirm this condition. This allows the system to make an accurate determination as to the appropriate correction. If wheels are on the ground, or recontact the ground after a lift condition, this also assists with accurate control.

Some systems use position sensors to measure the relative distance between the vehicle body and the vehicle suspension. One drawback to such systems is that the distance from the body to the road must be inferred. This also increases the number of sensors on the vehicle. Other techniques use sensor signals to indirectly detect wheel lifting qualitatively.

One example of a wheel lifting determination can be found in U.S. Pat. No. 6,356,188. The system applies a change in torque to the wheels to determine wheel lift. The output from such a wheel lifting determination unit can be used qualitatively. This method is an active determination since the basis of the system relies on changing the torque of the wheels by the application of brakes or the like. In some situations it may be desirable to determine wheel lift without changing the torque of a wheel.

It would therefore be desirable to provide a rollover detection system that improves reliability in predicting the occurrence of wheel lift during the operation of the automotive vehicle.

SUMMARY

It is therefore one object of the invention to provide a rollover detection system that may be used in conjunction with the dynamic stability control system of the vehicle to determine the presence of a potential rollover. The present invention seeks to determine the roll condition and wheel lifting in a number of ways using the sensors available from the vehicle control system. The various roll conditions are compared to roll thresholds to determine the likelihood that the wheel has lifted. The control system then can make a determination as to how to command the appropriate actuators to correct the potential rollover condition.

In one aspect of the invention, a wheel lift identification system for an automotive vehicle includes a first roll condition detector, a second roll condition detector, and a third roll condition detector. A controller determines wheel lift in response to the first, second, and third roll conditions.

In a further aspect of the invention, a method of controlling a vehicle having a plurality of wheels comprises determining a relative roll angle, determining a wheel departure angle, determining a rolling radius-based wheel departure angle, determining normal loading at each wheel, determining an actual road torque, determining a wheel longitudinal slip; and determining a wheel lift status for said plurality of wheels in response to said relative roll angle, said wheel departure angle, said rolling radius-based wheel departure roll angle, the normal loading at each wheel, an actual road torque and the wheel longitudinal slip.

One advantage of the invention is that by providing such a system an improved determination of wheel lifting may be determined. The accuracy of the roll angle calculation may correspondingly be increased, resulting in a more appropriate braking or steering evasive action.

Other advantages and features of the present invention will become apparent when viewed in light of the detailed description when taken in conjunction with the attached drawings and appended claims.

DETAILED DESCRIPTION

Figure 1:
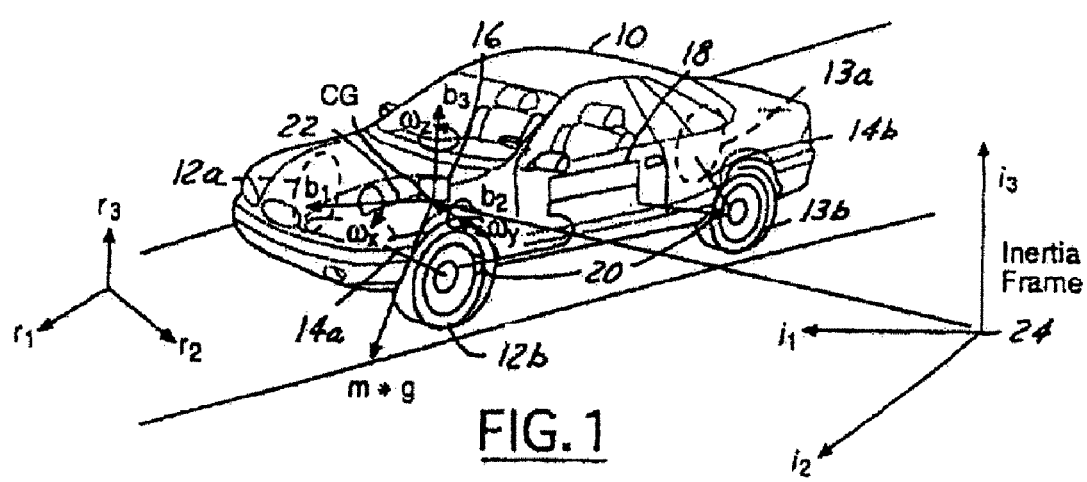
FIG. 1 is a diagrammatic view of a vehicle with variable vectors and coordinate frames according to one embodiment of the present invention.

In the following figures the same reference numerals will be used to identify the same components. The present invention may used in conjunction with a rollover control system for a vehicle. However, the present embodiment may also be used with a deployment device such as airbag or roll bar. The present invention will be discussed below in terms of embodiments relating to an automotive vehicle moving in a three-dimensional road terrain.

Wheel lift detection is the determination of when a wheel has lifted from the pavement. A passive system determines wheel lift indirectly using outputs from various sensors without perturbing the vehicle or wheels.

One aspect of the invention is passive wheel detection which is named in comparison with the so-called active wheel lift detection of U.S. Pat. No. 6,356,188. In active wheel lift detection, the wheel lifting is identified by requesting a change in torque at a wheel such as by applying a small amount of pressure in each wheel and then checking what the wheel slip ratio is doing. In passive wheel lift detection as set forth herein, the available sensor signals are used to identify wheel lifting without the system requiring a pressure command to the brake system of each wheel. Of course, as will be described below, active and passive detection may be used together. Wheel lifting typically occurs on the wheels on the inside of a turn. Depending on the vehicle configuration such as suspension, the front wheel or rear wheel may lift first.

Another aspect includes active and passive and yet another includes roll angle correction in response to wheel lift grounding.

Referring to FIG. 1, an automotive vehicle 10 with a safety system of the present invention is illustrated with the various forces and moments thereon during a rollover condition. Vehicle 10 has front right (FR) and front left (FL) wheel/tires 12A and 12B and rear right (RR) wheel/tires 13A and rear left (RL) tires 13B respectively. These tires are parenthetically identified 0, 1, 2, and 3 in some embodiments below. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s² and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a yaw control system (including lateral accelerometer, yaw rate sensor, steering angle sensor and wheel speed sensors) together with a roll rate sensor, a vertical accelerometer, and a longitudinal accelerometer. The various sensors will be further described below. The present embodiment uses the various sensors to determine wheel lift. The sensors may also be used by the control system in various determinations such as to determine a lifting event. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $w_x$ for the roll rate, $w_y$ for the pitch rate and $w_z$ for the yaw rate. The calculations may take place in an inertial frame 24 that may be derived from the body frame 22 as described below.

The angular rate sensors and the accelerometers may be mounted on the vehicle car body along the body frame directions $b_1$, $b_2$ and $b_3$, which are the x-y-z axes of the sprung mass of the vehicle.

The longitudinal acceleration sensor is mounted on the car body located at the center of gravity, with its sensing direction along $b_1$-axis, whose output is denoted as $a_x$. The lateral acceleration sensor is mounted on the car body and may be located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles (i.e., relative roll, relative pitch and relative yaw angles, respectively).

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a vertical acceleration sensor 33, a roll angular rate sensor 34, a steering wheel (hand wheel) angle sensor 35, a longitudinal acceleration sensor 36, a pitch rate sensor 37, steering angle (of the wheels or actuator) position sensor 38, suspension load sensor 40 and suspension position sensor 42.

Controller 26 may include a signal multiplexer 50 that is used to receive the signals from the sensors 28-42. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. Vehicle roll angle calculator 54 is described in provisional applications 60/400,376 and 60/400,172, and U.S. application Ser. No. 11/270,350, the disclosures of which are incorporated herein by reference.

Figure 2A:
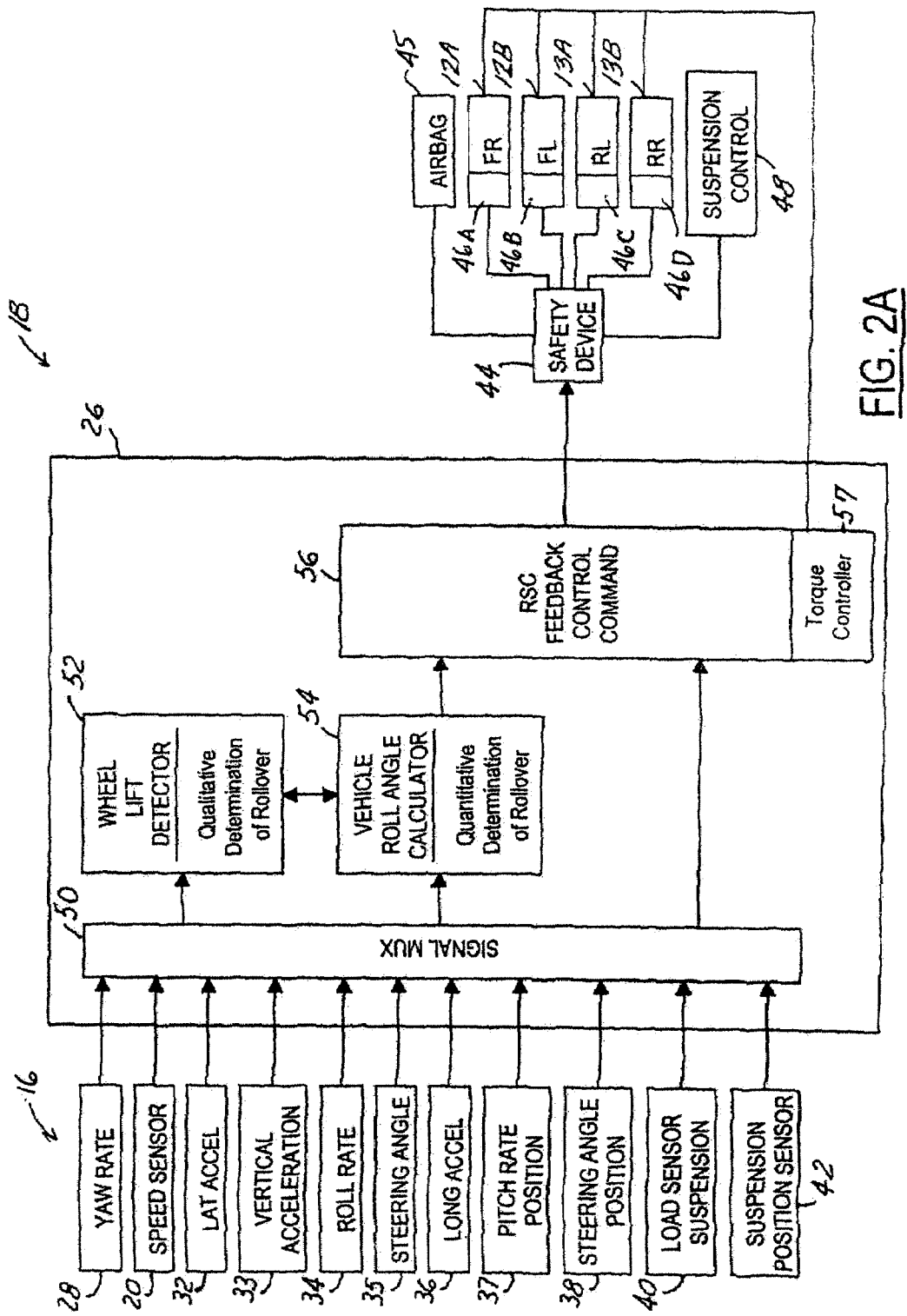
FIG. 2A is a block diagram of a stability system according to one embodiment of the present invention.
Figure 2B:
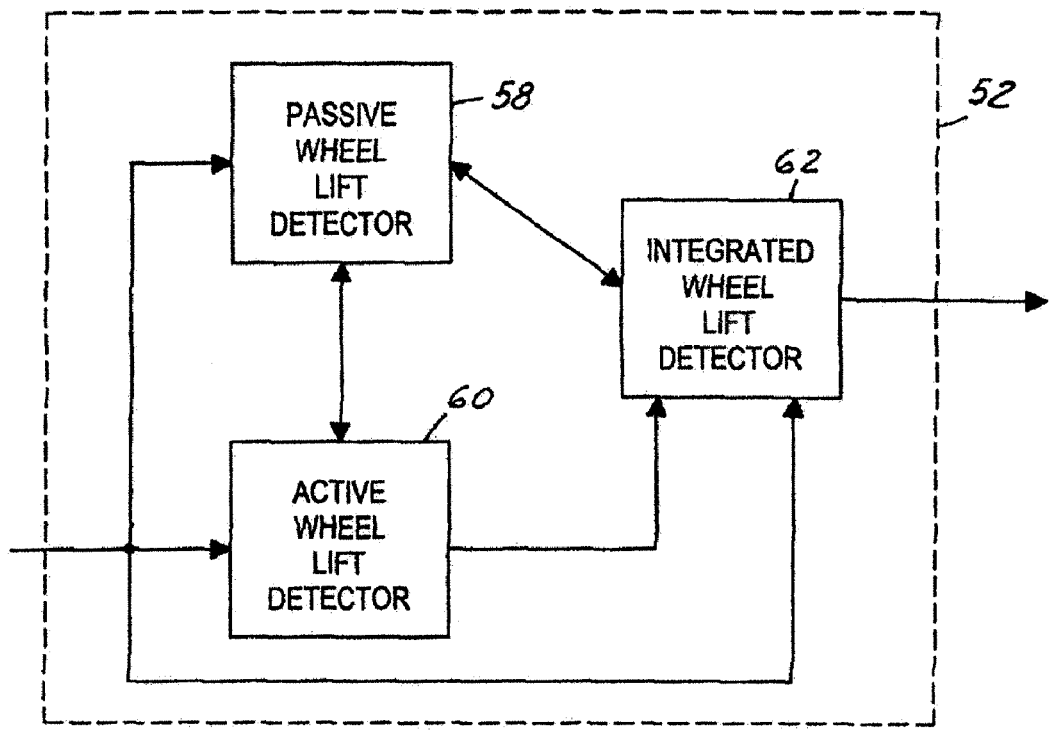
FIG. 2B is a block diagrammatic view of the wheel lift detection system of FIG. 2A.

Referring now also to FIG. 2B, the wheel lift detector 52 may include passive wheel detector 58 as will be further described herein, active wheel detector 60 as described above with respect to the prior art and an integrated wheel lift detector 62. Thus, both active and passive may be used together. As will be further described below, an arbitration scheme between the active and passive lifting may be used in a wheel final lift determination within the integrated wheel lift detector 62.

Figure 2C:
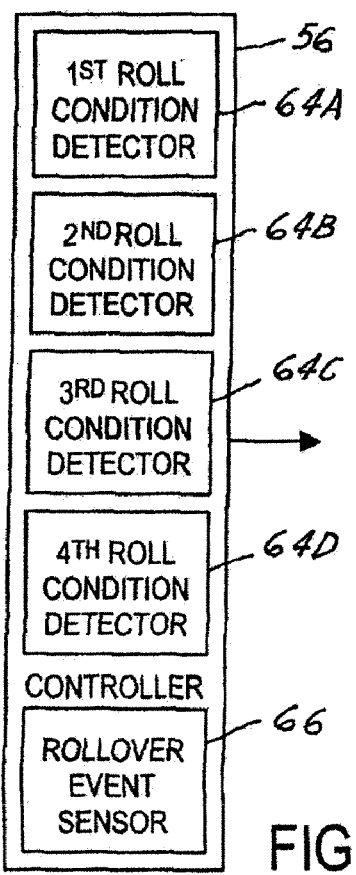
FIG. 2C is a block diagrammatic view of the rollover stability control feedback command of FIG. 2A.

Referring now also to FIG. 2C, the roll stability control (RSC) controller 26 may also include a first roll condition detector 64A, a second roll condition detector 64B, a third roll condition detector 64C, a fourth roll condition detector 64D, and a roll event sensor 66. It should be noted that the implementation of the wheel lift detector 52, the vehicle roll angle calculator 54, the roll stability control feedback control command 56 having a torque control system 57 (described further below), the passive wheel lift detection 58, the active wheel lift detection 60, and the integrated wheel lift detection 62 may all be incorporated in software within the controller 26. Separate control devices may also be used.

Wheel lift detector 52 determines a qualitative determination of vehicle rollover. This is in contrast to the vehicle roll angle calculator 54, which is a quantitative determination of rollover. Active wheel lift detector 60 can be determined in many ways including U.S. Provisional Applications 60/400, 375 and 60/400,156, both filed Aug. 1, 2002, and U.S. Pat. No. 6,356,188, the disclosures of which are incorporated by reference herein. The integrated wheel lift detector 62 is set forth in U.S. Provisional Application 60/401,418 filed Aug. 5, 2002, the disclosure of which is incorporated herein. Vehicle roll angle calculator 54 is described in U.S. Provisional Applications 60/400,376 and 60/400,172, both filed Aug. 1, 2002, and Ford Disclosure 201-0938 (FGT 1660), which are incorporated by reference herein.

In one embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-42 may be used in a commercial embodiment. Safety device 44 may control an airbag 45 or a steering actuator/braking actuator 46A-D at one or more of the wheels 12A, 12B, 13A, 13B of the vehicle. Also, other vehicle components such as a suspension control 48 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 42. The position sensor 42, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing directly or estimating the force or torque associated with the loading condition of one or more suspension or chassis components including a pressure transducer in an air suspension, a shock absorber sensor such as a load sensor 40, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift. These are passive methods as well.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position of the wheels.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

Several different combinations of sensors may be used to determine a wheel lift status. Once the qualitative wheel lift is determined, quantitative roll condition may be determined. The following is a summary of how the quantitative wheel lifting indication from the various vehicle motion variables after qualitative wheel lifting status is identified.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module by using the roll rate and lateral acceleration sensor signals. If both the relative roll angle and the wheel departure angles are large enough, the vehicle may be in either single wheel lifting or double wheel lifting. On the other hand, if the magnitude of both angles are small enough, the wheels are likely all grounded.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up.

The roll condition of the vehicle can be characterized by the normal loading sustained at each wheel. Theoretically, when a normal loading at a wheel decreases to zero, the wheel is no longer contacting the road surface. In this case a potential rollover is under the way. Large magnitude of this loading indicates that the wheel is grounded.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the nonlinear torques calculated from the normal loading and the longitudinal slip at each wheel.

Relative Roll Angle and Wheel Departure Angle Using Lateral Acceleration and Roll Angular Rate Sensor The roll condition of a vehicle can be characterized by the relative roll angle $\theta_{xr}$ between the vehicle body and the wheel axle, which has been calculated by using the roll rate and lateral acceleration sensor signals. If this roll angle is increasing rapidly, the vehicle might be in the edge of wheel lifting or rollover. Small magnitude of this angle indicates the wheels are not lifted or are all grounded.

The roll condition of a vehicle can also be characterized by the roll angle between the wheel axle and the average road surface, this is called wheel departure angle. If this roll angle is increasing rapidly, the vehicle has lifted wheel or wheels and aggressive control action needs to be taken in order to prevent the vehicle from rolling over. Small magnitude of this angle indicates the wheels are not lifted. This section describes how to quantitatively determine the vehicle roll angle when a qualitative wheel lifting is identified. That is, if a qualitative wheel lifting is detected, a quantitative computation of the wheel lifting may be initiated.

Figure 3:
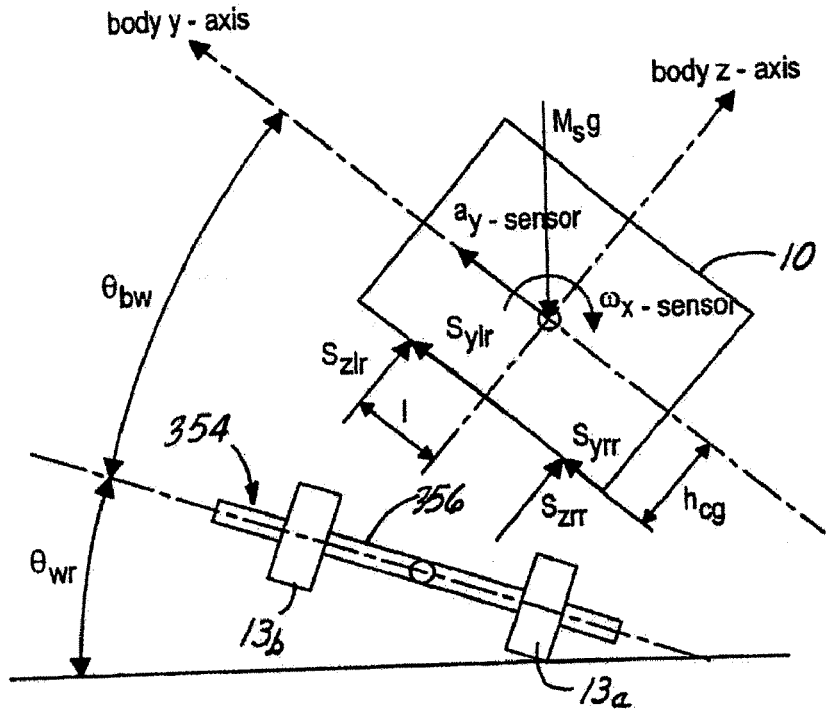
FIG. 3 is a diagrammatic view of a vehicle showing the displacement of the vehicle body and axle relative to road surface.
Figure 4:
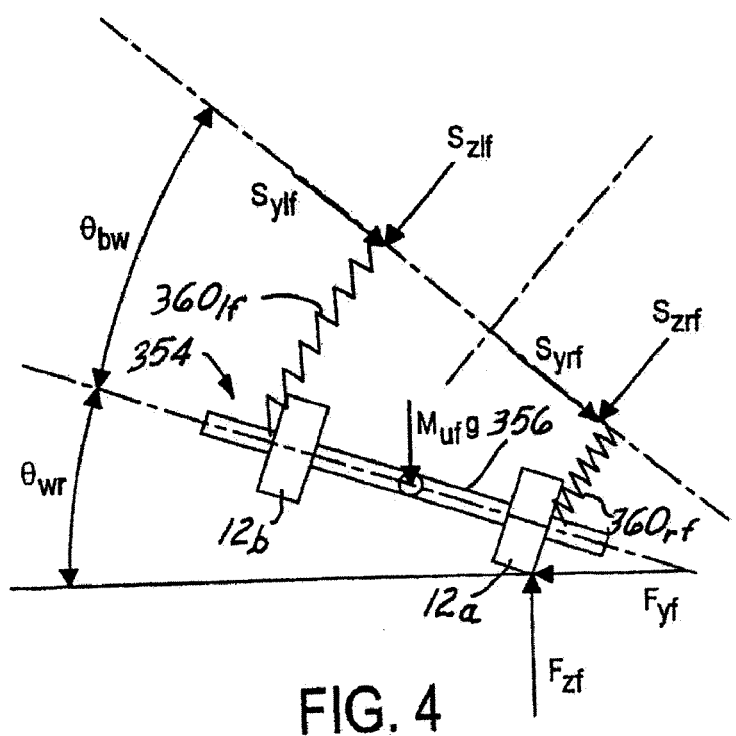
FIG. 4 is a diagrammatic view showing the forces applied to the front wheel/tire/suspension assembly during a potential rollover event.
Figure 5:
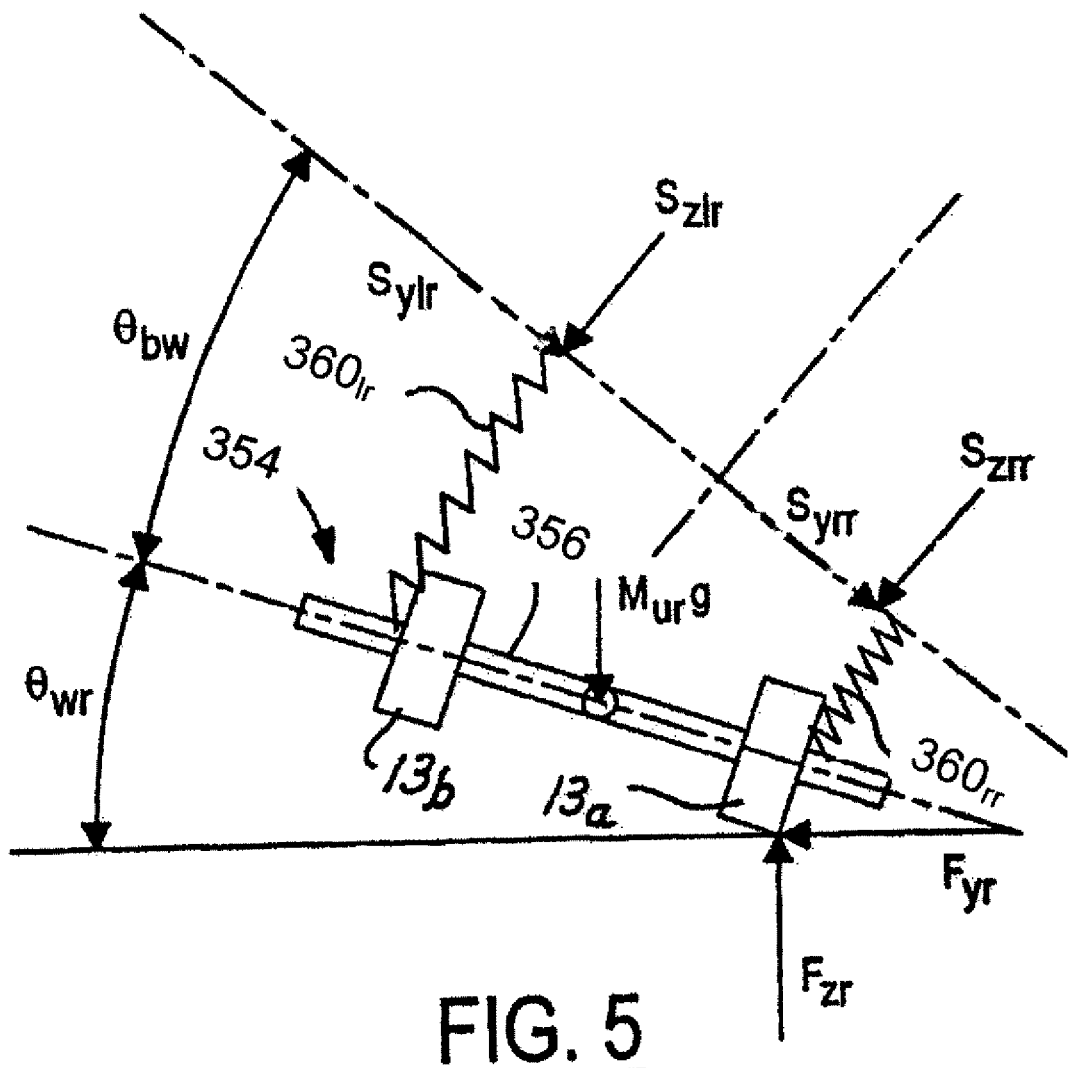
FIG. 5 is a diagrammatic view showing the forces applied to the rear wheel/tire/suspension assembly during a potential rollover event.

Referring now to FIGS. 3, 4 and 5, the present invention will be discussed below in terms of embodiments relating to an automotive vehicle having a wheel/tire/suspension assembly 354 during potential rollover events where one side of the vehicle is lifted or wheels on one side of the vehicle lose contact with the road surface or wheels on one side do not carry normal loadings. The wheel/tire/suspension assembly has an axle 356. Although a physical axle may not be present, axle is a term used for the common axis of the front or rear wheels.

The sensing system uses the lateral acceleration sensor 32 and the roll angular rate sensor 34 to determine wheel lift in one of the roll condition detectors 64A-D. The lateral acceleration sensor 32 is used to measure the total lateral acceleration of the center of gravity of the vehicle body, and the roll rate sensor 34 measures the vehicle body roll angular rate. The method of determining wheel lifting using the roll rate sensor 34 and the lateral acceleration sensor 32 is described in U.S. patent application Ser. No. 11/270,350, the disclosure of which is incorporated by reference.

The vehicle body 10 is connected with the wheel/tire assemblies 12A, 12B, 13A, 13B through suspensions $360_{lf}$, $360_{rr}$, $360_{lf}$ and $360_{rf}$ collectively suspension 360. The tire forces are transferred to the vehicle body through the suspensions 360. Those forces can be projected along the vehicle body-fixed y- and z-axes. The suspension forces projected along the body-fixed y axis (or body-fixed lateral direction) are denoted as $S_{ylf}$, $S_{yrf}$, $S_{ylr}$, $S_{yrr}$ at the left-front, right-front, left-rear and right-rear corners; the suspension forces projected along the body-fixed z axis (or body-fixed vertical direction) as $S_{zlf}$, $S_{zrf}$, $S_{zlr}$, $S_{zrr}$. The total lateral forces applied to the vehicle body along the body-fixed lateral axis are $S_y$, i.e.

$$S_y = S_{ylf} + S_{yrf} + S_{ylr} + S_{yrr}. \quad (1)$$

The vehicle body has roll angular displacement due to the suspension forces and the vehicle roll accelerations. The roll angular rate of the vehicle body is $w_x$. Around center of gravity of the vehicle body, the suspension forces-induced roll moment around the vehicle center of gravity (c.g.) needs to match the inertia moment from this $w_x$. The suspension forces-induced roll moment around the c.g. has two terms:

the roll moment $M_{susp-vert}$ due to the vertical suspension forces $S_{zlf}, S_{zrf}, S_{zlr}, S_{zrr}$;

the roll moment $M_{susp-lat}$ due to the total lateral suspension force $S_y$.

From FIG. 5, the following expressions for $M_{susp-vert}$ and $M_{susp-lat}$ may be obtained $$M_{susp-vert}=(S_{zrf}-S_{zlf}+S_{zrr}-S_{zlr})l$$

$$M_{susp-lat}=S_y h_{cg}. \quad (2)$$

The vehicle body roll angular rate must satisfy the following $$I_x \dot{w}_x = M_{susp-vert} + M_{susp-lat} \quad (3)$$

where $I_x$ is the vehicle body roll moment of inertia around the c.g. of the vehicle body. If the suspension resultant roll stiffness and roll damping rates (including anti-roll-bars, suspensions, etc.) are respectively defined as $K_{roll}$ and $D_{roll}$, and $\theta_{bw}$ as the relative angular displacement between the vehicle body and the average wheel axle, then the roll moment due to vertical suspension forces $M_{susp-vert}$ can be further expressed as $$M_{susp-vert}=-K_{roll}\theta_{bw}-D_{roll}\dot{\theta}_{bw}. \quad (4)$$

The roll moment due to lateral suspension forces $M_{susp-lat}$ at needs to be further defined so that the roll angular rate sensors and the lateral accelerometer may be used. The longitudinal and lateral velocities of the c.g. of the vehicle body are $v_x$ and $v_y$, which are measured along body-fixed x- and y-axis respectively, and $w_z$ is the yaw rate of the vehicle. The lateral dynamics of the vehicle body will satisfy the following equation of motion based on Newton's law:

$$M_s(\dot{v}_y+w_z v_x)=S_y+M_s g \sin(\theta_{bw}+\theta_{wr}) \quad (5)$$

where $\theta_{wr}$ is the relative angular displacement between the wheel axle and the road surface, (or the departure angle of the wheel axle from the road surface), $M_s$ is the vehicle body mass (or the sprung mass of the vehicle). Solving $S_y$ from (5) and substituting $S_y$ into the second equation of (2) leads to $$M_{susp-lat}=M_s(\dot{v}_y+w_z v_x)h_{cg}-M_s g \sin(\theta_{bw}+\theta_{wr})h_{cg}. \quad (6)$$

The dynamic equation to depict the wheel axle departure angle from the road surface. There are two wheel sets, one on the front (FIG. 4) and one on the rear (FIG. 5). Due to the differences in front and rear suspensions and inertias, there are slight differences between the front and the rear wheel axle departure angles. $\theta_{wr-front}$ is denoted as the front wheel departure angle and $\theta_{wr-rear}$ is denoted as the rear wheel departure angle. The average of those two angles is used to define the angle $\theta_{wr}$ $$\theta_{wr}=\frac{\theta_{wr-front}+\theta_{wr-rear}}{2}. \quad (7)$$

The assembly consists of the wheel, the tires and the suspensions. FIG. 5 shows the rear axle of such assembly. In order to avoid solving the front lateral and vertical tire forces $F_{yf}$ and $F_{zf}$, the rear lateral and vertical tire forces $F_{yr}$ and $F_{zr}$, the equation of motion was written around the outer tire contact patch for front and rear assemblies $$I_{wxf}\ddot{\theta}_{wr}=(h-h_{cg})\cos(\theta_{bw})[S_{ylf}+S_{ylf}]-M_{uf}g l_w \cos(\theta_{wr})+(S_{zlf}-S_{zrf})l$$

$$I_{wxr}\ddot{\theta}_{wr}=(h-h_{cg})\cos(\theta_{bw})[S_{ylr}+S_{yrr}]-M_{ur}g l_w \cos(\theta_{wr})+(S_{zlr}-S_{zrr})l \quad (8)$$

where $h_{cg}$ is the distance between the vehicle body c.g. and the road surface when the car is parked; $I_{wxf}$ and $I_{wxr}$ are the roll moments of inertia of the front and rear wheel/tire/suspension assemblies around the contact patches of the outer tires; $M_{uf}$ and $M_{ur}$ are the total masses of the front and rear wheel/tire/suspension assemblies; $l_w$ is the half of the wheel track.

Up to now, vehicle states or motion variables were associated with the relative roll angles of interest. The goal is to determine the relative roll angles with the available sensor signals. In order to establish the connection, the sensor signals are related with those motion variables used to derive equations (3) and (8). First consider the lateral acceleration sensor output, which is denoted as $a_{y-sensor}$. The measured signal $a_{y-sensor}$ includes various components due to the vehicle yaw, longitudinal, lateral motions and gravity, and it can be related to the lateral, longitudinal, yaw motion variables and the gravity, as in the following:

$$a_{y-sensor}=\dot{v}_y+w_z v_x-g \sin(\theta_{bw}+\theta_{wr}) \quad (9)$$

and the roll angular rate sensor output measures the same roll rate used before, i.e., $$w_{x-sensor}=w_x. \quad (10)$$

Substituting (9) into (5) leads to $$M_{susp-lat}=M_s h_{cg} a_{y-sensor}$$

$$S_y=M_s a_{y-sensor}. \quad (11)$$

Therefore (3) can be simplified into $$\dot{\theta}_{bw}=-c_1 \theta_{bw}-c_2 \dot{w}_{x-sensor}+c_3 a_{y-sensor} \quad (12)$$

where the coefficients in the equation can be related to the vehicle parameters as in the following:

$$c_1=-\frac{K_{roll}}{D_{roll}}, c_2=\frac{I_x}{D_{roll}}, c_3=\frac{M_s h_{cg}}{D_{roll}}.$$

Adding together the two equations in (8) and Substituting (11) into the resultant equation leads to the following equation $$\ddot{\theta}_{wr}=-d_1 \cos(\theta_{wr})+d_2 a_{y-sensor} \cos(\theta_{bw})+d_3 \theta_{bw}+d_4 \dot{\theta}_{bw} \quad (13)$$

where the coefficients in the equation can be related to the vehicle parameters as $$d_1=\frac{(M_{uf}+M_{ur})l_w}{I_{wxf}+I_{wxr}}g, d_2=\frac{M_s(h-h_{cg})}{I_{wxf}+I_{wxr}},$$

$$d_3=\frac{K_{roll}}{I_{wxf}+I_{wxr}}, d_4=\frac{D_{roll}}{I_{wxf}+I_{wxr}}.$$

Based on (12) and, the angles of interests can be related to the two sensor signals $a_{y-sensor}$ and $w_{x-sensor}$. A digital algorithm using a Tyler expansion to the continuous time differential equation in order to obtain the digital version of the sensing algorithm can be used as in the following for estimating the relative roll angles $$\theta_{bw}(k+1)=\theta_{bw}(k)+\Delta T*f(k)$$

$$x(k+1)=x(k)+\Delta T*g(k)$$

$$\theta_{wr}(k+1)=\theta_{wr}(k)+\Delta T*x(k)+\Delta T^2*g(k) \quad (14)$$

where $\Delta T$ is the sampling time of the implemented algorithm, $$f(k)=-c_1\theta_{bw}(k)-c_2w_{x\text{-}sensor}(k)+c_3a_{y\text{-}sensor}(k)$$

$$g(k)=-d_1\cos(\theta_{wr}(k))+d_2a_{y\text{-}sensor}(k)\cos(\theta_{bw}(k))+d_3\theta_{bw}(k)+d_4\theta_{bw}(k). \quad (15)$$

In a digital implementation, the previously known angles are iteratively used in the angle determinations. This reduces the over all number of processing steps which leads to faster results and ultimately those angles add more control authority to the potential vehicle rollover event.

Since the quantitative determination of the wheel departure angle as in (14) depends on when the computation should be started, a qualitative rollover indication is required. One of such qualitative rollover indication is the wheel lifting detection. Thus, based on the wheel lifting status using the method proposed in this disclosure, a quantitative determination of how large the wheel lift is may be determined, which can be used to generate brake control command.

Rolling Radius-Based Wheel Departure Roll Angle, $\theta_{rr\text{-}whl}$

Based on the rolling radius-based wheel departure angle, a first qualitative indication of wheel lifting may be made as one of the roll condition detectors 64. The rolling radius r(i) of the i-th rolling wheel of a moving vehicle is related to the i-th wheel speed $w_i$ (from the i-th ABS wheel speed sensor) and the linear corner velocity of the wheel $v_c(i)$ (calculated from the steering angle, the side slip angle and the reference velocity of the vehicle) in the following equation:

$$r(i) = \frac{v_c(i)R(i)}{w(i)} \quad (16)$$

where i=0, 1, 2, 3 implies the front-left, front-right, rear-left and rear-right wheel, and R(i) is the nominal rolling radius used to convert the rotational speed of each wheel to a linear speed. Usually $R(0)=R(1)=R_f$ for front wheels and $R(2)=R(3)=R_r$ for rear wheels, or $R(0)=R(1)=R(2)=R(3)=R_0$.

The linear corner velocity is derived from the following equation:

$$v_c(0)=V_x[\cos(\delta)+\tan(\beta)\sin(\delta)]+w_z[l_f\sin(\delta)-t_f\cos(\delta)]$$

$$v_c(1)=V_x[\cos(\delta)+\tan(\beta)\sin(\delta)]+w_z[l_f\sin(\delta)+t_f\cos(\delta)]$$

$$v_c(2)=V_x-w_zt_r$$

$$v_c(3)=V_x+w_zt_r \quad (16.5)$$

where $t_f$ and $t_r$ are the half tracks for the front and rear axles, $l_f$ and $l_r$ are the distances between the center of gravity of the vehicle and the front and rear axles, $\delta$ is the steering angle at the front wheel, $\beta$ is the side slip angle of the vehicle, $w_z$ is the yaw rate of the vehicle.

The front axle rolling radii-based wheel departure angle $\theta_{rr\text{-}whl}(0)$ can be computed from the rolling radii of the front-left and front-right rolling radii in the equation $$\theta_{rr\text{-}whl}(0) = \tan^{-1}\left[\frac{r(0)-r(1)}{t_f}\right] \quad (17)$$

and the rear axle rolling radii-wheel departure angle $\theta_{rr\text{-}whl}(1)$ may be calculated from the following equation $$\theta_{rr\text{-}whl}(1) = \tan^{-1}\left[\frac{r(2)-r(3)}{t_r}\right] \quad (18)$$

where $t_f$ is the width of the front wheel track and $t_r$ is the rear wheel track. Axle refers to a common axis not necessarily a fixed or physical axle. Using formula (16), (17) and (18), the angles $\theta_{rr\text{-}whl}(0)$ and $\theta_{rr\text{-}whl}(1)$ can be computed as in the following

```
if v_ref > 5
    for (i = 0; i < 4; ++)
    {
        r(i) = sat( v_c(i)R_0 / max(w(i), 0.01), p_MAX_DRR );
    }
    θ_rr-whl(0) = sat( (r(0) - r(1)) / t_f, p_MAX_WDA );
    θ_rr-whl(1) = sat( (r(2) - r(3)) / t_f, p_MAX_WDA );
}
else
{
    θ_rr-whl(0) = 0;
    θ_rr-whl(1) = 0;
}
``` where p_MAX_DRR (for example, 1000) is the allowed maximum dynamic rolling radius, and p_MAX_WDA (for example, 13 degree) is the maximum rolling radius based wheel departure angle.

Notice that the above deviation assumes that the wheel has negative slip, i.e., there are braking torques applied to the wheels. In the case there are positive torques applied to the wheels, a negative sign is needed. The system is passive in a sense that a change in torque is not purposely applied as an active actuator command and it is a quantity passively received or observed. That is, the engine operating input torque is used.

```
if (τ_active(0) > 0 && τ_active(1) > 0)
{
    θ_rr-whl(0) = -θ_rr-whl(0);
}
if (τ_active(2) > 0 && τ_active(3) > 0)
{
    θ_rr-whl(1) = -θ_rr-whl(1);
}
``` where $\tau_{active}(i)$ denotes the observed torque applied to the ith wheel, which could be either a driving torque or a braking torque, or say $\tau_{active}(i)=\tau_{driving}(i)-\tau_{braking}(i)$.

Notice that the above computation provides accurate captures for the front and rear wheel axle departure angle if the involved two wheels have zero or small longitudinal slip ratio (by comparing a calculated longitudinal slip ratio to a longitudinal slip ratio threshold. In the case when a large wheel longitudinal slip is experienced, the afore-mentioned computations are no longer very accurate. However, they may still be used to identify a significant slip difference between left and right wheels. If one of the involved wheels has large slip ratio (for example, its wheel speed is close to zero), the computation of (17) or (18) will amplify the wheel departure angle (very large wheel departure angle up to 90 degree, this is not the true wheel departure angle). If both the involved wheels have the similar but large slip ratios, (17) or (18) will still be small, implying grounded wheels for both left and right sides.

Thus, the computation as in (17) or (18) provides accurate description of wheel departure angle (wheel roll angle) from the average road surface if the wheels do not experience large longitudinal slip; it provides amplified characterization when the involved left and right wheels have significant slip differences.

Longitudinal Wheel Slip Ratio

Another way in which to passively detect wheel lift in one of the roll condition detectors 64 uses longitudinal wheel slip ratio. Longitudinal wheel slip may be used to generate a second qualitative indication of wheel lift.

The slip power is defined as the product of the slip ratio and the time derivative of the slip ratio. The longitudinal slip ratio is the ratio of the $$\frac{\text{wheel speed}}{\text{vehicle speed}} = \text{vehicle speed.}$$

The vehicle speed may be the vehicle speed at the corner of the vehicle as described below. If the ith wheel slip is denoted as s(i) for i=0, 1, 2, 3, then $$s_p(i) = s(i)\frac{ds(i)}{dt}. \tag{19}$$

The calculated slip power $s_p$ reflects the magnitude variation of the wheel slip ratio with respect to time $$\frac{d}{dt}[s(i)]^2 = 2s(i)\frac{ds(i)}{dt} = 2s_p(i). \tag{20}$$

Therefore, positive slip power implies divergent wheel slip (magnitude of slip ratio is increased), negative slip power indicates a convergent slip ratio (the magnitude of slip ratio is decreased), zero slip power implies that the slip ratio is kept constant. Since during wheel lifting, both braking torque and driving torque will generate divergent slip for the wheel, hence positive slip power is expected. While in the case of wheel touch-down or a grounded wheel, convergent wheel slip (negative slip power) is expected.

```
for (i = 0; i < 4; i++)
{
    ds(i) = p_10HZ_COEF * ds(i) +(s(i)- z1_s(i)) *
    (1 - p_10HZ_COEF) /0.007;
    z1_s(i) = s(i) ;
}
``` where p_10 HZ_COEF (for example, 0.9) is the coefficient reflecting a low-pass filter with 10 Hz cut-off frequency.

Thus, wheel slip power provides a real-time characterization of the trend of the wheel slips during transient wheel speed changes to provide a qualitative indication of wheel lifting and thus a wheel lift signal.

Slip Rate Wheel Lift

The roll condition or wheel lift of the vehicle can also be seen indirectly from the wheel longitudinal slip rate. If during a normal braking or driving torque the wheels at one side of the vehicle experience an increased magnitude of slip rate, then the wheels are losing longitudinal road torque. This implies that the wheels are either driven on a low mu surface or lifted up. Thus, the longitudinal slip rate $s_r$ may be used in a determination of torque based qualitative determination of the wheel lifting.

The slip rate is defined as the product of the corner velocity and the time derivative of the slip ratio for the ith wheel, i.e., $$s_r(i) = v_c(i)\frac{ds(i)}{dt}. \tag{21}$$

Thus calculated slip rate is related to wheel acceleration $$\frac{d}{dt}w(i) = \frac{d}{dt}\{v_c(i)[s(i)+1]\} \tag{22}$$
$$= s_r(i) + [s(i) + 1]\frac{dv_c(i)}{dt}.$$

Considering corner velocity $v_c(i)$ is usually smooth, (22) can be simplified to $$\frac{d}{dt}w(i) \approx s_r(i). \tag{23}$$

Hence slip rate is a characterization of the wheel acceleration but with computation advantage, i.e., smoothness. Notice that during transient wheel speed changes, (23) is very accurate due to the fact that the wheel acceleration magnitude is much larger than the magnitude of the time derivative of the corner velocity.

```
for (i = 0; i < 4; i++)
{
    s_r(i) = sat(v_c(i) *
    ds(i),-p_MAX_SLIP_RATE,p_MAX_SLIP_RATE);
}
``` where p_MAX_SLIP_RATE (for example, 300) is the upper bound for limiting slip rate. Thus, as can be seen from the above formula, slip rate can be determined within bounds of the p_MAX_SLIP_RATE using equation (21). The slip rate is compared to a threshold. If the slip rate increases above a slip rate threshold, then the wheel may be possibly lifted.

As will be further described below, the calculated wheel slip rate may also be used to compute the actual torques applied to each wheel.

Wheel Lift Using Normal Loading

The roll condition of the vehicle can also be characterized by the normal loading sustained at each wheel. Theoretically, the normal loading of a wheel decreasing to or near zero indicates that the wheel is no longer contacting the road surface. In this case a potential rollover is under the way. Large magnitude of this loading indicates that the wheel is grounded.

Normal loading is also used in a torque based wheel lift determination as described below. The normal loading as used herein is the dynamic normal loading, which is experienced by any of the four wheels during vehicle dynamic maneuvers. Those normal loadings are measured along the normal directions of the contact patches, which are the areas where the wheels and the road surface meets. If the vehicle is driven on a level ground, then the normal loadings are located at the contact patches between the road and the wheels, and are perpendicular to the road surface.

The defined dynamic normal loading of each wheel consists of two portions: the portion due to the heave motion of the vehicle (denoted as $N_{heave}$) and the portion due to the other motions of the vehicle (denoted as $N_{non-heave}$). That is, the total normal loading at each wheel (denoted as $N_{total}$) is the sum of $N_{heave}$ and $N_{non-heave}$.

The heave motion generated normal loading can be calculated as the following $$N_{heave}(0) = N_{heave}(1) = Ma_z \cos(\theta_{xr})\cos(\theta_{yr})\frac{l_r}{2(l_f + l_r)} \qquad (24)$$

$$N_{heave}(2) = N_{heave}(3) = Ma_z \cos(\theta_{xr})\cos(\theta_{yr})\frac{l_f}{2(l_f + l_r)}$$

where $a_z$ is a vertical acceleration signal from the vertical acceleration sensor 33 that may be mounted on the vehicle body but at the center of gravity of the vehicle; M is the total mass of the vehicle; $\theta_{xr}$ is the relative roll angle between the vehicle body and the axle of the wheels that is derived from the roll rate sensor; $\theta_{yr}$ is the relative pitch angle between the vehicle body and the road surface that is derived from the pitch rate sensor; $l_f$ is the distance of the vehicle center of gravity from the front axle, and $l_r$ is the distance of the vehicle center of gravity from the rear axle.

The non-heave motion portion of the normal loadings are due to the other motion of the vehicle, including the roll and pitch angular motion of the vehicle body with respect to the road surface, the load transfers due to the longitudinal and lateral accelerations, which can be calculated as in the following $$N_{non-heave}(0) = K_f(-\theta_{xr}t_f + \theta_{yr}l_f)\cos(\theta_{xr})\cos(\theta_{yr})$$

$$N_{non-heave}(1) = K_f(\theta_{xr}t_f + \theta_{yr}l_f)\cos(\theta_{xr})\cos(\theta_{yr})$$

$$N_{non-heave}(2) = K_r(-\theta_{xr}t_r - \theta_{yr}l_r)\cos(\theta_{xr})\cos(\theta_{yr})$$

$$N_{non-heave}(3) = K_r(\theta_{xr}t_r - \theta_{yr}l_r)\cos(\theta_{xr})\cos(\theta_{yr}) \qquad (25)$$

where $K_f$ is the spring rate of the front suspensions and $K_r$ is the spring rate of the rear suspensions.

Consequently, the total normal loadings at the wheels can be expressed as the following $$N_{total}(0) = \qquad (26)$$
$$Ma_z\cos(\theta_{xr})\cos(\theta_{yr})\frac{l_r}{2(l_f + l_r)} + K_f(-\theta_{xr}t_f + \theta_{yr}l_f)\cos(\theta_{xr})\cos(\theta_{yr})$$

$$N_{total}(1) = Ma_z\cos(\theta_{xr})\cos(\theta_{yr})\frac{l_r}{2(l_f + l_r)} +$$
$$K_f(\theta_{xr}t_f + \theta_{yr}l_f)\cos(\theta_{xr})\cos(\theta_{yr})$$

$$N_{total}(2) = Ma_z\cos(\theta_{xr})\cos(\theta_{yr})\frac{l_f}{2(l_f + l_r)} +$$
$$K_r(-\theta_{xr}t_r - \theta_{yr}l_r)\cos(\theta_{xr})\cos(\theta_{yr})$$

$$N_{total}(3) = Ma_z\cos(\theta_{xr})\cos(\theta_{yr})\frac{l_f}{2(l_f + l_r)} +$$
$$K_r(\theta_{xr}t_r - \theta_{yr}l_r)\cos(\theta_{xr})\cos(\theta_{yr})$$

If in case the heave motion of the vehicle is negligible, i.e., the heave acceleration of the vehicle is small. Then the vertical acceleration sensor output should be close to the gravity, i.e.

$$a_z \approx g \qquad (27)$$

In this case an approximation of the normal loadings can be written as the following $$N_{total}(0) \approx Mg\frac{l_r}{2(l_f + l_r)} + K_f(-\theta_{xr}t_f + \theta_{yr}l_f) \qquad (28)$$

$$N_{total}(1) \approx Mg\frac{l_r}{2(l_f + l_r)} + K_f(\theta_{xr}t_f + \theta_{yr}l_f)$$

$$N_{total}(2) \approx Mg\frac{l_f}{2(l_f + l_r)} + K_r(-\theta_{xr}t_r - \theta_{yr}l_r)$$

$$N_{total}(3) \approx Mg\frac{l_f}{2(l_f + l_r)} + K_r(\theta_{xr}t_r - \theta_{yr}l_r).$$

The calculated normal loadings provide an indication of wheel lift above. When the normal load is near zero, this provides an indication of wheel lift. The normal loads are thus compared to a normal load threshold. When the normal loads are lower (below the threshold) or near zero, the wheel has lifted. The normal loadings may also be used to compute the road torques described below.

Wheel Lift Using Road Torque

The roll condition or wheel lift can also be identified by checking the actual road torques applied to the wheels and the road torques, which are needed to sustain the wheels when the wheels are grounded. The actual road torques can be obtained through torque balancing for each wheel using wheel acceleration, driving torque and braking torque. If the wheel is contacting the road surface, the calculated actual road torques must match or be larger than the nonlinear torques calculated from the normal loading and the longitudinal slip at each wheel.

The actual road torques $\tau_{road}$ applied to the wheel together with the driving torque $\tau_d$, braking torque $\tau_d$ and the wheel rotation inertia $I_w$ obey the following Newton's law $$I_{wf}\frac{d}{dt}\left[\frac{WhlSpd(0)}{R_{0f}}\right] = \tau_d(0) - \tau_b(0) - \tau_{road}(0) \quad (29)$$

$$I_{wf}\frac{d}{dt}\left[\frac{WhlSpd(1)}{R_{0f}}\right] = \tau_d(1) - \tau_b(1) - \tau_{road}(1)$$

$$I_{wr}\frac{d}{dt}\left[\frac{WhlSpd(2)}{R_{0r}}\right] = \tau_d(2) - \tau_b(2) - \tau_{road}(2)$$

$$I_{wr}\frac{d}{dt}\left[\frac{WhlSpd(3)}{R_{0r}}\right] = \tau_d(3) - \tau_b(3) - \tau_{road}(3).$$

Using equations (23), (29) the road torques may be calculated in $$\tau_{road}(0) \approx \tau_d(0) - \tau_b(0) - I_{wf}\frac{s_r(0)}{R_{0f}} \quad (30)$$

$$\tau_{road}(1) \approx \tau_d(1) - \tau_b(1) - I_{wf}\frac{s_r(1)}{R_{0f}}$$

$$\tau_{road}(2) \approx \tau_d(2) - \tau_b(2) - I_{wr}\frac{s_r(2)}{R_{0r}}$$

$$\tau_{road}(3) \approx \tau_d(3) - \tau_b(3) - I_{wr}\frac{s_r(3)}{R_{0r}}$$

Road Torque when the Wheel is Grounded

If the wheel is grounded, i.e., contacting the road surface, then the grounded road torque $\tau_{road\text{-}grd}(i)$ is related to the wheel slip ratio s(i), the wheel side slip angle α(i) and the wheel dynamic normal loading $N_{total}(i)$ through a nonlinear functional relationship as in the following $$\tau_{road\text{-}grd}(i) = N_{total}(i)\phi(s(i),\alpha(i)). \quad (31)$$

A linearization for the nonlinear function $\phi(\bullet,\bullet)$ could be obtained as the following $$\phi(s(i),\alpha(i)) = \kappa(\alpha(i))s(i). \quad (32)$$

If the wheel side slip angle is small, equation (30) could be approximated as the following $$\tau_{road\text{-}grd}(i) \approx \kappa(i)N_{total}(i)s(i) \quad (33)$$

where κ(i) is the initial slope of the function κ(α(i)). The approximation (33) can be implemented as in the following

```
for (i = 0; i < 4; i++)
{
    if ( s(i) ≤ 0 && s(i) ≥ p_BRAKING_LIN_SLIP
        || s(i) ≥ 0 && s(i) ≤ p_DRIVING_LIN_SLIP )
    {
        τ_road-grd(i) = N_total(i) * p_SLIP_TO_RT_GAIN * s(i) * R_0;
    }
    else if ( s(i) ≤ p_BRAKING_LIN_SLIP )
    {
        τ_road-grd(i) = N_total(i) *
            p_SLIP_TO_RT_GAIN * p_BRAKING_LIN_SLIP * R_0;
    }
    else
    {
        τ_road-grd(i) = N_total(i) *
            p_SLIP_TO_RT_GAIN * p_DRIVING_LIN_SLIP * R_0;
    }
}
```
(34)

where p_BRAKING_LIN_SLIP (for example, −10%) is a braking slip threshold and p_DRIVING_LIN_SLIP (for example, 25%) is a driving slip threshold. The thresholds are the maximum slip when the linear relationship between road torque and the slip are valid during braking and driving cases.

As can be seen by the above logic, if during braking the slip ratio is less than or equal to zero and the slip ratio is greater than or equal to a braking slip threshold, or during driving the slip rate is greater than or equal to zero and the slip rate is less than or equal to the driving slip threshold, the road torque can be determined by one of the three formulas.

The following is a list of the output variables of the passive wheel lift detector 58. As can be seen, the output has a plurality of levels. Each one of the wheel lift determinations may generate an output variable or state as will be described below. In some instances the states are characterized in a numerical sense with "absolutely grounded" being the highest value and "no indication" as the lowest value.

| OUTPUT VARIABLES |
| --- |
| Passive wheel lift status: PWLD(i). |
| If the ith wheel is absolutely grounded, then PWLD(i) = ABSOLUTELY_GROUNDED |
| If the ith wheel is in the edge of grounding, PWLD(i) = POSSIBLY_GROUNDED |
| If the ith wheel is absolutely lifted, then PWLD(i) = ABSOLUTELY_LIFTED |
| If the ith wheel is in the beginning of lifting PWLD(i) = POSSIBLY_LIFTED |
| If the ith wheel's status cannot be firmly identified, PWLD(i) = NO_INDICATION |

The following parameters are used in the determination of wheel lifting status.

| PARAMETERS |
| --- |
| p_MAX_DRR : the upper bound for dynamic rolling radius. In this example a value of (1000 m) was used. |
| p_MAX_WDA : the upper bound for the rolling radius based wheel departure angle. In this example a value of (13 deg) was used. |

PARAMETERS p_ROLL_TH_05 = 0.05 * ROLL_GRADIENT
p_ROLL_TH_25 = 0.25 * ROLL_GRADIENT
p_ROLL_TH_40 = 0.40 * ROLL_GRADIENT
p_ROLL_TH_55 = 0.55 * ROLL_GRADIENT
p_ROLL_TH_75 = 0.75 * ROLL_GRADIENT
p_STAT_NLOAD_F : the static normal loading of the front wheels (per wheel).
p_STAT_NLOAD_R : the static normal loading of the rear wheels (per wheel).
p_SLIP_RT_GAIN : the gain used to convert slip ratio to normalized road torque.
  In this example a value of (6) was used.
p_NLOAD_LOSS : the allowed percentage of normal loading loss.
  In this example a value of (0.3) was used.
p_GRD_DW_DWA_TH : the allowed wheel departure angle for grounded driven wheel.
  In this example a value of (0.41 deg) was used.
p_GRD_NDW_DWA_TH : the allowed wheel departure angle for grounded non - driven wheel. In this example a value of (1.25 deg) was used.
p_LFT_DW_DWA_TH : the min wheel departure angle for grounded driven wheel to lift. In this example a value of (4 deg) was used.
p_LFT_NDW_DWA_TH : the min wheel departure angle for grounded non - driven wheel to lift. In this example a value of (10 deg) was used.
p_GRD_PR_TH : the braking pressure for grounded wheel torque condition.
  In this example a value of (6 bar) was used.
p_LFT_PR_TH : the braking pressure for lifted wheel select - low torque condition.
  In this example a value of (20 bar) was used.
p_LFT_SP_MIN_TH : the min slip power for possibly grounded condition.
  In this example a value of (0.4) was used.

Comparison Logic

Various comparisons are used by the embodiment to determine the qualitative level or lack thereof of wheel lifting. The passive wheel lift detector 58 sets PWLD(i) for i=0, 1, 2, 3, where 0 represents the FL wheel, 1 represents the RL wheel, and 3 represents the RR wheel. If PUVLD(i)=ABSOLUTELY_GROUNDED, then the ith wheel is definitely contacting the road surface; if PWLD(i)=POSSIBLY_GROUNDED, then the ith wheel is about to contact the road surface; if PWLD(i)=ABSOLUTELY_LIFTED then the ith wheel is definitely lifted or up in the air; if PWLD(i)=POSSIBLY_LIFTED, then the ith wheel is about leaving contacting the road surface; if PWLD(i)=NO_INDICATION, then there is no firm indication for both lifting and grounding for the ith wheel.

The roll information is first used to screen the grounding and lifting trends of the wheels. The following rough screening uses the relative roll angle $\theta_{xr}$ and the roll rate based wheel departure angle $\theta_{whl}$. If both the magnitudes of $\theta_{xr}$ and $\theta_{whl}$ are small, the vehicle wheels are probably grounded:

```
if (θxr > 0)
{ if ( θxr ≦ p_ROLL_TH_55 & & θwhl ≦ p_ROLL_TH_05 )
    {   PWLD(0) = POSSIBLY_GROUNDED
        PWLD(2) = POSSIBLY_GROUNDED;   }
  else
    {   PWLD(0) = NO_INDICATION;
        PWLD(2) = NO_INDICATION;   }}
else
{   if ( θxr ≧ - p_ROLL_TH_55 & &θwhl ≧ - p_ROLL_TH_05 )
    {   PWLD(1) = POSSIBLY_GROUNDED;
        PWLD(3) = POSSIBLY_GROUNDED;   }
    else
    {   PWLD(1) = NO_INDICATION;
        PWLD(3) = NO_INDICATION;   }
}
```
(35)

where p_ROLL_TH_05 is the static relative roll angle corresponding to 5% of the roll gradient, p_ROLL_TH_55 is the static relative roll angle corresponding to 55% of the roll gradient. If both the magnitudes of $\theta_{xr}$ and $\theta_{whl}$ are large, the vehicle wheels are probably lifted. After the above first cut, a refinement for determining absolutely grounded and absolutely lifted conditions is conducted.

The first concern is the detection of the absolutely grounded condition for the wheels. Several variables, including $N_{total}(i)$, $\tau_{road}(i)$, $\tau_{road-grd}(i)$ and the rolling radii based wheel departure angle $\theta_{rr-whl}(0)$, $\theta_{rr-whl}(1)$, are used to checking whether the ith wheel is absolutely grounded. Assume that the roll angle screening through logic (35) indicates that the wheels of interest are possibly grounded. In order to confirm the possibly grounded wheels are actually absolutely grounded, the following conditions are then checked. If any of those conditions is met, an absolutely grounded flag is set for the wheel of interest.

Normal loading condition: if PUVLD(i)=POSSIBLY_GROUNDED and at the same time the normal loading satisfies $$N_{total}(i) \geq N_{th}(i)$$

then PWLD(i)=ABSOLUTELY_GROUNDED. Here four variables $N_{th}(i)$ for i=0, 1, 2, 3 are used as the minimum normal loadings for the wheels when they are grounded:

$$N_{th}(0) = p\_STAT\_NLOAD\_F*(1-p\_NLOAD\_LOSS);$$

$$N_{th}(1) = p\_STAT\_NLOAD\_F*(1-p\_NLOAD\_LOSS);$$

$$N_{th}(2) = p\_STAT\_NLOAD\_R*(1-p\_NLOAD\_LOSS);$$

$$N_{th}(3) = p\_STAT\_NLOAD\_R*(1-p\_NLOAD\_LOSS);$$

Slip power condition: if PWLD(i)=POSSIBLY_GROUNDED and at the same time the slip power is negative ($s_p(i)<0$), i.e., the magnitude of the slip ratio is decreasing (convergent slip ratio), then set the wheel lift flag as PWLD(i)=ABSOLUTELY_GROUNDED.

Road torque condition: if PWLD(i)=POSSIBLY_GROUNDED and at the same time the magnitude of the actual road torque $\tau_{road}(i)$ from (30) is greater than the grounded wheel road torque $\tau_{road\text{-}grd}(i)$ from (33) and both have the same sign, or $$\tau_{road}(i)\tau_{road\text{-}grd}(i) \geq 0$$

and $$|\tau_{road}(i)| \geq |\tau_{road\text{-}grd}(i)|$$

then PUVLD(i)=ABSOLUTELY_GROUNDED.

Active torque condition: if PWLD(i)=POSSIBLY_GROUNDED, and at the same time the active torque (either braking torque or driving torque) applied to the ith wheel is larger enough while the wheel departure angle generated from rolling radii $\theta_{rr\text{-}whl}(j)$ for j=0, 1 is small enough, then the ith wheel is deemed to be absolutely grounded. Notice that the thresholds for driven wheels and non-driven wheels are different.

The following logic is a summary of the above discussion for the case where the vehicle is turned left and the left side of the vehicle has the potential trend to lift up.

```
if θ_xr > 0
{ if ( PLWD(0) == POSSIBLY_GROUNDED
    & &( N_total(0) ≥ N_th(0)
      || s_p(0) < 0
      || (τ_road(0) * τ_road-grd(0) ≥ 0 & & | τ_road(0) |≥| τ_road-grd(0))
      || (| θ_rr-whl(0) |≤ p_GRD_DW_DWA_TH & & P_τ(0) == 2
          & & | τ_active(0) |≥ p_GRD_PR_TH *
            BRKTQ_GAIN_F)
      || (θ_rr-whl(0) |≤ p_GRD_NDW_DWA_TH & & P_τ(0)! = 2
          & & τ_active(0) |≥ p_GRD_PR_TH *
            BRKTQ_GAIN_F) ) )
  { PWLD(0) = ABSOLUTELY_GROUNDED; }
  if ( PLWD(2) == POSSIBLY_GROUNDED
    & &( N_total(2) ≥ N_th(2)
      || s_p(2) < 0
      || (τ_road(2) * τ_road-grd(2) ≥ 0 & & | τ_road(2) |≥| τ_road-grd(2))
      || (| θ_rr-whl(1) |≤ p_GRD_DW_DWA_TH & & P_τ(2) == 2
          & & | τ_active(2) |≥ p_GRD_PR_TH *
            BRKTQ_GAIN_R)
      || (θ_rr-whl(1) |≤ p_GRD_NDW_DWA_TH & & P_τ(0)! = 2
          & & τ_active(2) |≥ p_GRD_PR_TH *
            BRKTQ_GAIN_R) ) )
  { PWLD(2) = ABSOLUTELY_GROUNDED; }
}
```
(37)

If the vehicle is turned to the right, then the following logic is used for detecting an absolutely grounded condition

```
if θ_xr ≤ 0
{ if ( PLWD(1) == POSSIBLY_GROUNDED
    & &( N_total(1) ≥ N_th(1)
      || s_p(1) < 0
      || (τ_road(1) * τ_road-grd(1) ≥ 0 & & | τ_road(1) |≥| τ_road-grd(1))
      || (| θ_rr-whl(0) |≤ p_DW_DWA_TH & & P_τ(1) == 2
          & & | τ_active(1) |≥ p_GRD_PR_TH *
            BRKTQ_GAIN_F)
      || (θ_rr-whl(1) |≤ p_NDW_DWA_TH & & P_τ(1)! = 2
          & & τ_active(1) |≥ p_GRD_PR_TH *
            BRKTQ_GAIN_F) ) )
  { PWLD(1) = ABSOLUTELY_GROUNDED; }
  if ( PLWD(3) == POSSIBLY_GROUNDED
    & &( N_total(3) ≥ N_th(3)
      || s_p(3) < 0
      || (τ_road(3) * τ_road-grd(3) ≥ 0 & & | τ_road(3) |≥| τ_road-grd(3))
      || (| θ_rr-whl(1) |≤ p_DW_DWA_TH & & P_τ(3) == 2
          & & | τ_active(3) |≥ p_GRD_PR_TH * BRKTQ_GAIN_R)
      || (θ_rr-whl(1) |≤ p_NDW_DWA_TH & & P_τ(3)! = 2
          & & τ_active(3) |≥ p_GRD_PR_TH *
            BRKTQ_GAIN_R) ) )
  { PWLD(3) = ABSOLUTELY_GROUNDED; }
}
```
(38)

where the torque BRKTQ_GAIN_F and BRKTQ_GAIN_R are two parameters used to convert the braking pressure at the front and rear wheels to the braking torque applied to the front and rear wheels; p_PRESS_TH denotes the pressure used to set threshold for active torques.

Notice that the four variables $P_\tau(i)$ for i=0, 1, 2, 3 are used in the logic (38) and (39), which are called the torque pattern variables. $P_\tau(i)$s are used to identify the torque patterns where the meaningful wheel lifting information can be identified. This torque patterning includes positive torques for both left and right side in the front or the rear axle; negative torques for both left and right side in the front or the rear axle. In order to eliminate the wheel slip difference due to significant torque difference between the left and right wheels, the lower of two values is selected. These values are (1) the torque applied to the current wheel of interest, and (2) the torque applied to the other wheel on the same axle plus the torque generated from 20 bar of brake pressure $$P_\tau(0) = \tau_{active}(0) \leq 0 \text{ \&\& } \tau_{active}(1) \leq 0 \text{ \&\& } \qquad (39)$$
$$|\tau_{active}(0)| \leq |\tau_{active}(1)| + \text{p\_LFT\_PR\_TH} * \text{BRKTQ\_GAIN\_F} +$$
$$(\tau_{active}(0) > 0 \text{ \&\& } \tau_{active}(1) > 0 \text{ \&\& } |\tau_{active}(0)| \leq$$
$$|\tau_{active}(1)| + \text{p\_LFT\_PR\_TH} * \text{BRKTQ\_GAIN\_F} * 2;$$

$$P_\tau(2) = \tau_{active}(2) \leq 0 \text{ \&\& } \tau_{active}(3) \leq 0 \text{ \&\& }$$
$$|\tau_{active}(2)| \leq |\tau_{active}(3)| + \text{p\_LFT\_PR\_TH} * \text{BRKTQ\_GAIN\_R} +$$
$$(\tau_{active}(2) > 0 \text{ \&\& } \tau_{active}(3) > 0 \text{ \&\& } |\tau_{active}(2)| \leq$$
$$|\tau_{active}(3)| + \text{p\_LFT\_PR\_TH} * \text{BRKTQ\_GAIN\_R} * 2;$$

$$P_\tau(1) = \tau_{active}(1) \leq 0 \text{ \&\& } \tau_{active}(0) \leq 0 \text{ \&\& }$$
$$|\tau_{active}(1)| \leq |\tau_{active}(0)| + \text{p\_LFT\_PR\_TH} * \text{BRKTQ\_GAIN\_F} +$$
$$(\tau_{active}(1) > 0 \text{ \&\& } \tau_{active}(0) > 0 \text{ \&\& } |\tau_{active}(1)| \leq$$
$$|\tau_{active}(0)| + \text{p\_LFT\_PR\_TH} * \text{BRKTQ\_GAIN\_F} * 2;$$

$$P_\tau(3) = \tau_{active}(3) \leq 0 \text{ \&\& } \tau_{active}(2) \leq 0 \text{ \&\& }$$
$$|\tau_{active}(3)| \leq |\tau_{active}(2)| + \text{p\_LFT\_PR\_TH} * \text{BRKTQ\_GAIN\_R} +$$
$$(\tau_{active}(3) > 0 \text{ \&\& } \tau_{active}(2) > 0 \text{ \&\& } |\tau_{active}(3)| \leq$$
$$|\tau_{active}(2)| + \text{p\_LFT\_PR\_TH} * \text{BRKTQ\_GAIN\_R} * 2;$$

Now the wheels are checked for a lifted condition. Assume the initial roll information screening as through logic (35) indicates a wheel of interest as no indication, then the wheel is probably in the lifting trend. In this case further roll condition screening for potential lifting is conducted

```
if θ_xr > 0
{   θ_cond = ( θ_xr ≥ p_ROLL_TH_75
      || (θ_xr ≥ p_ROLL_TH_50 & & θ_whl ≥ p_ROLL_TH_25)
```

-continued

```
   || (θ_xr ≧ p_ROLL_TH_40 & &
      θ_whl ≧ p_ROLL_TH_75 )); }
else
{  θ_cond = ( θ_xr ≦ -p_ROLL_TH_75
   || (θ_xr ≦ - p_ROLL_TH_50 & &
      θ_whl ≦ -p_ROLL_TH_25)
   || (θ_xr ≦ -p_ROLL_TH_40 & &
      θ_whl ≦ - p_ROLL_TH_75 ));
}
```
(40)

where p_ROLL_TH_75, p_ROLL_TH_50, p_ROLL_TH_40 and p_ROLL_TH_25 are the static relative roll angle corresponding to 75%, 50%, 40% and 25% of the roll gradient. If the above roll screening condition $\theta_{cond}=1$, then the first cut for lifting detection is obtained. Notice that the actual wheel departure angle $\theta_{whl}$ (calculated from the roll rate sensor) is different from the rolling radius based wheel departure angle $\theta_{rr\text{-}whl}(0)$ (for front wheels) and $\theta_{rr\text{-}whl}(1)$ (for rear wheels). As in the grounding wheel detection, further confirmation is needed to obtain absolutely lifted condition. Let $PL_{cond}(i)$ be the possibly lifted flags for the ith wheel, it can be calculated based on the following two conditions which reflect possibly lifted conditions:

Slip power condition: if the slip power of the ith wheel $s_p(i) \geq 0$ indicates that this wheel has a divergent slip ratio, i.e., the magnitude of the slip ratio is increasing. (Considering potential non-braking drag on the wheels, a small negative number is used instead of 0 is used, i.e., we use $s_p(i) \geq -0.01$ to replace $s_p(i) \geq 0$).

Normal loading condition: if the ith normal load $N_{total}(i)$ is smaller than a constant threshold, then the ith wheel is possibly lifted;

For positive relative roll angle, $PL_{cond}(0)$ and $PL_{cond}(2)$ are calculated as in the following

```
if θ_xr > 0
{
   PL_cond(0) = s_p(0) ≧ -0.01 & &( θ_cond == 1 || N_total(0) ≦
      p_LOAD_F * p_LOSS);
   PL_cond(2) = s_p(2) ≧ -0.01 & &( θ_cond==1 || N_total(2) ≦
      p_LOAD_R * p_LOSS);
}
```
(41)

If the relative roll angle $\theta_{xr}$ is negative, $PL_{cond}(\mathbf{1})$ and $PL_{cond}(\mathbf{3})$ can be calculated as in the following

```
if θ_xr ≦ 0
{
   PL_cond(1) = s_p(1) ≧ -0.01 & &( θ_cond == 1 || N_total(1) ≦
      p_LOAD_F * p_LOSS);
   PL_cond(3) = s_p(3) ≧ -0.01 & &( θ_cond == 1 || N_total(3) ≦
      p_LOAD_R * p_LOSS);
}
```
(42)

Using the calculated condition flags, $PL_{cond}(i)$ will be used to set possibly lifted status of wheels

```
for (i = 0; i < 4; i++)
{
   if PL_cond(i) == 1)
      PWLD(i) = POSSIBLY_LIFTED;
}
```
(43)

Now the absolutely lifted conditions are determined. In the following we assume the wheels are already in possibly lifted status through (42).

Torque Select-Low Condition for Non-Driven Wheel

In this case, if the applied braking torque satisfied the torque pattern condition, i.e., for the right loaded wheel case $$\tau_{active}(\text{left}) \geq \tau_{active}(\text{right}) - p\_PRES\_SL\_TH*BRKTQ\_GAIN \quad (44)$$

and for left loaded wheel case $$\tau_{active}(\text{right}) \geq \tau_{active}(\text{left}) - p\_PRES\_SL\_TH*BRKTQ\_GAIN \quad (45)$$

then the wheel lifting will be checked with the rolling radius based wheel departure angle condition for front wheels $$|\theta_{rr\text{-}whl}(0)| \geq p\_NDW\_WDA\_TH \quad (46)$$

and for rear wheels $$|\theta_{rr\text{-}whl}(1)| \geq p\_NDW\_WDA\_TH \quad (47)$$

where the threshold p_NWD_WDA_TH is the threshold for non-driven wheel's rolling radius based wheel departure angle.

Torque Select-Low Condition for Driven Wheel During Engine Braking

In this case torque select-low condition is the same as (29) and (30), but the wheel departure angle conditions needs to use different threshold. For right-loaded wheel case $$|\theta_{rr\text{-}whl}(0)| \geq p\_DW\_WDA\_TH \quad (48)$$

and for rear wheels $$|\theta_{rr\text{-}whl}(1)| \geq p\_DW\_WDA\_TH \quad (49)$$

Torque Select-Low Condition for Driven Wheel During Engine Driving

In this case, the torque select-low condition is the same as the following for the right loaded wheel $$\tau_{active}(\text{left}) \leq \tau_{active}(\text{right}) + p\_PRES\_SL\_TH*BRKTQ\_GAIN \quad (50)$$

and for left loaded wheel case $$\tau_{active}(\text{right}) \leq \tau_{active}(\text{left}) + p\_PRES\_SL\_TH*BRKTQ\_GAIN \quad (51)$$

A detailed logic can be summarized as the following for the righted loaded wheel case:

```
if θ_xr > 0
{
  if (PWLD(0) == NO_INDICATION & &PWLD(0) ==
  POSSIBLY_LIFTED)
  {
     if ( P_τ(0) == 1 & & θ_rr-whl(0) ≧ p_LFT_NDW_WDA_TH
     || P_τ(0) == 2 & & θ_rr-whl(0) ≧ p_LFT_DW_WDA_TH
     || P_τ(0) == 1 & & θ_rr-whl(0) ≧ p_LFT_DW_WDA_TH
     & & (DRIVE_MODE == FRONT || DRIVE_MODE == FOUR ||
           DRIVE_MODE == TOD) )
     )
     {   PWLD[0] = ABSOLUTELY_LIFTED; }
     if (s_p(0) ≦ - p_LFT_SP_MIN_TH )
     {   PWLD[0] = POSSIBLY_GROUNDED; }
  }
  if (PWLD)2) == NO_INDICATION & &PWLD(2) ==
  POSSIBLY_LIFTED)
  {
     if    (P_τ(2) == 1 & & θ_rr-whl(1) ≧ p_LFT_NDW_WDA_TH
     || P_τ(2) == 2 & & θ_rr-whl(1) ≧ p_LFT_DW_WDA_TH
     || P_τ(2) == 1 & & θ_rr-whl(1) ≧ p_LFT_DW_WDA_TH
     & & (DRIVE_MODE == FRONT || DRIVE_MODE == FOUR ||
           DRIVE_MODE == TOD)
     )
     {   PWLD(2) = ABSOLUTELY_LIFT; }
     if (s_p(2) ≦ - p_LFT_SP_MIN_TH)
     {   PWLD(2) = POSSIBLY_GROUNDED; }
  }
}
                                                               (52)
```

Notice that the drive mode is checked in order to distinguish between driven wheel engine braking and non-driven wheel braking. If the slip power is negative enough, i.e., the slip ratio has rapid convergent rate, then possibly grounded wheel condition is identified.

A detailed logic can be summarized as the following for the left loaded wheel case:

```
if θ_xr ≦ 0
{
  if (PWLD(1) == NO_INDICATION & &PWLD(1) ==
  POSSIBLY_LIFTED)
  {
     if ( P_τ(1) == 1 & & θ_rr-whl(0) ≦ -p_LFT_NDW_WDA_TH
     || P_τ(1) == 2 & & θ_rr-whl(0) ≦ -p_LFT_DW_WDA_TH
     || P_τ(1) == 1 & & θ_rr-whl(0) ≦ -p_LFT_DW_WDA_TH
     & & (DRIVE_MODE == FRONT || DRIVE_MODE == FOUR ||
           DRIVE_MODE == TOD) )
     )
     {   PWLD(1) = ABSOLUTELY_LIFTED; }
     if (s_p(1) ≦ -p_LFT_SP_MIN_TH )
     {   PWLD(1) = POSSIBLY_GROUNDED; }
  }
  if (PWLD(3) == NO_INDICATION & &PWLD(3) ==
  POSSIBLY_LIFTED)
  {
     if   (P_τ(3) == 1 & & θ_rr-whl(1) ≦ p_LFT_NDW_WDA_TH
     || P_τ(3) == 2 & & θ_rr-whl(1) ≦ p_LFT_DW_WDA_TH
     || P_τ(3) == 1 & & θ_rr-whl(1) ≦ p_LFT_DW_WDA_TH
     & & (DRIVE_MODE == FRONT || DRIVE_MODE == FOUR ||
           DRIVE_MODE == TOD)
     )
     {   PWLD(3) = ABSOLUTELY_LIFT; }
     if (s_p(3) ≦ - p_LFT_SP_MIN_TH )
     {   PWLD(3) = POSSIBLY_GROUNDED; }
  }
}
```

Figure 6:
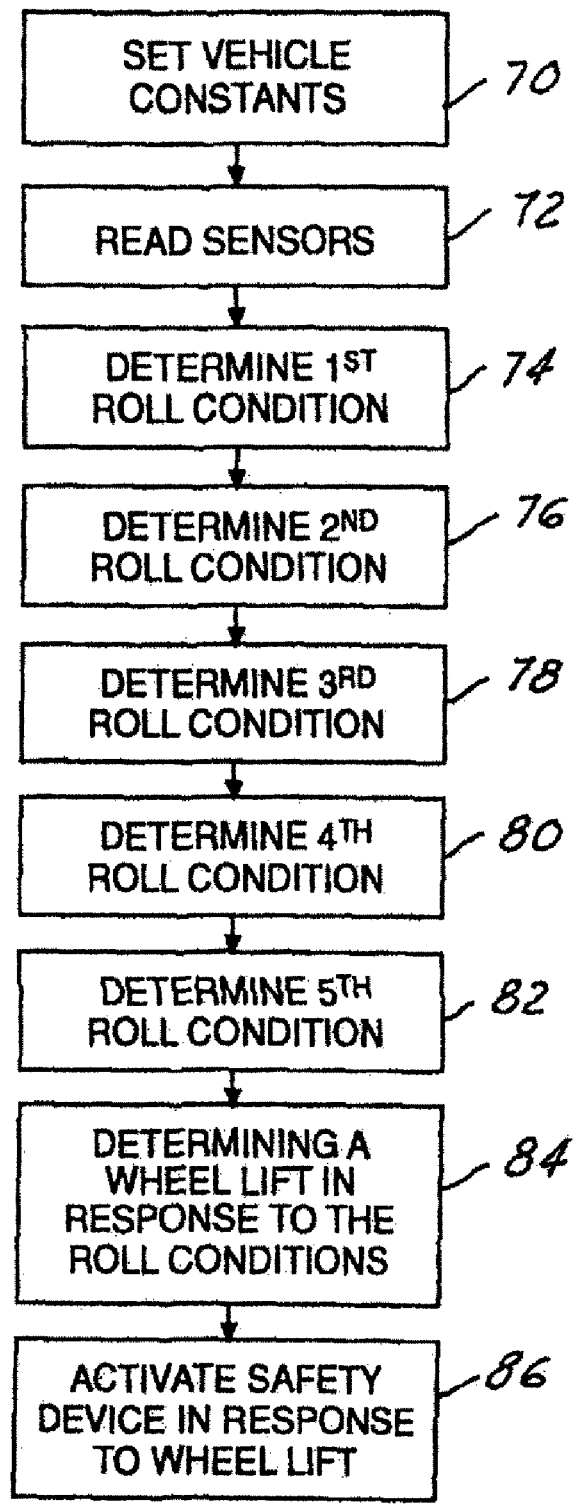
FIG. 6 is flow chart of a passive wheel lift determination according to one embodiment of the present invention.

Referring now to FIG. 6, a method for controlling an automotive vehicle as described above is now summarized. In step 70, the vehicle constants are determined. As described above, various vehicle constants are used in the present embodiment. The vehicle constants are determined during vehicle testing and vary with different suspensions and vehicle configurations. Such vehicle constants include suspension resultant roll stiffness $K_{roll}$, roll damping rates $D_{roll}$, the height of the center of gravity of the vehicle, the masses of the vehicle including the inertial masses which include the roll moments of inertia of the front and rear wheel tire assemblies around the contact patches of the outer tires, and the total masses of the front and rear wheels/tires/suspension assemblies. In step 72 the various sensors are read. The various sensors may include sensors in FIG. 2. In steps 74-82 a first through fifth roll conditions are determined. The conditions may include a relative roll angle and a wheel departure angle calculated from a roll rate sensor and a lateral acceleration sensor, a rolling radius-based wheel departure angle, normal loading at each wheel, an actual road torque and a wheel longitudinal slip. At least three determinations are desirable. However, for a more robust system all five roll conditions may be determined.

In step 84 wheel lift in response to the roll conditions are determined. In step 86 the rollover control system may be activated to counter vehicular rolling motion in response to the wheel lift signal. Of course, as described below actuation may be based on a roll angle while the wheel lift detection may be used to adjust various parameters such as relative roll angle or the road bank angle.

What has been described above are several different ways in which to determine wheel lift passively.

Active Wheel Lift Using Change of Torque

Both passive and active wheel lift detection may be used in a rollover control system or other safety system.

From FIG. 2A above, the command controller 56 may include a torque controller 57 that is used to control the torque of the wheels 12A, 12B, 13A, 13B. Torque controller 57 may act in conjunction with the electronic engine controller, a driveline engagement mechanism or braking system, or a combination of these to control the torque at one or all of the wheels 12A, 12B, 13A, 13B. Torque controller 57 and roll controller 18 may be coupled to wheel speed sensors 20 located at each of the wheels. Wheel speed sensors 20 provide roll control system 26 with a signal indicative of the speed of the individual wheel to which it is attached. Various types of wheel speed sensors including toothed-wheel type systems would be evident to those skilled in the art.

In the following active wheel lift example, the application of brake pressure is used to provide the change in torque. However, other methods such as applying engine torque may also be used to change the amount of torque at a wheel. Further references to the application of torque to a wheel may include hydraulic or electric brake torque, changes in engine torque or engagement of driveline torque through the use of an electronically controlled transfer case, differential, transmission or clutch. The present embodiment may also be used to determine if a sensor has failed in the sensor system 16. That is, if roll is suspected by a particular sensor, but all other conditions or sensors indicate otherwise, the sensor may be operating improperly. Also, although speed is used, wheel acceleration may also be used in place of speed as would be evident to those skilled in the art.

Figure 7:
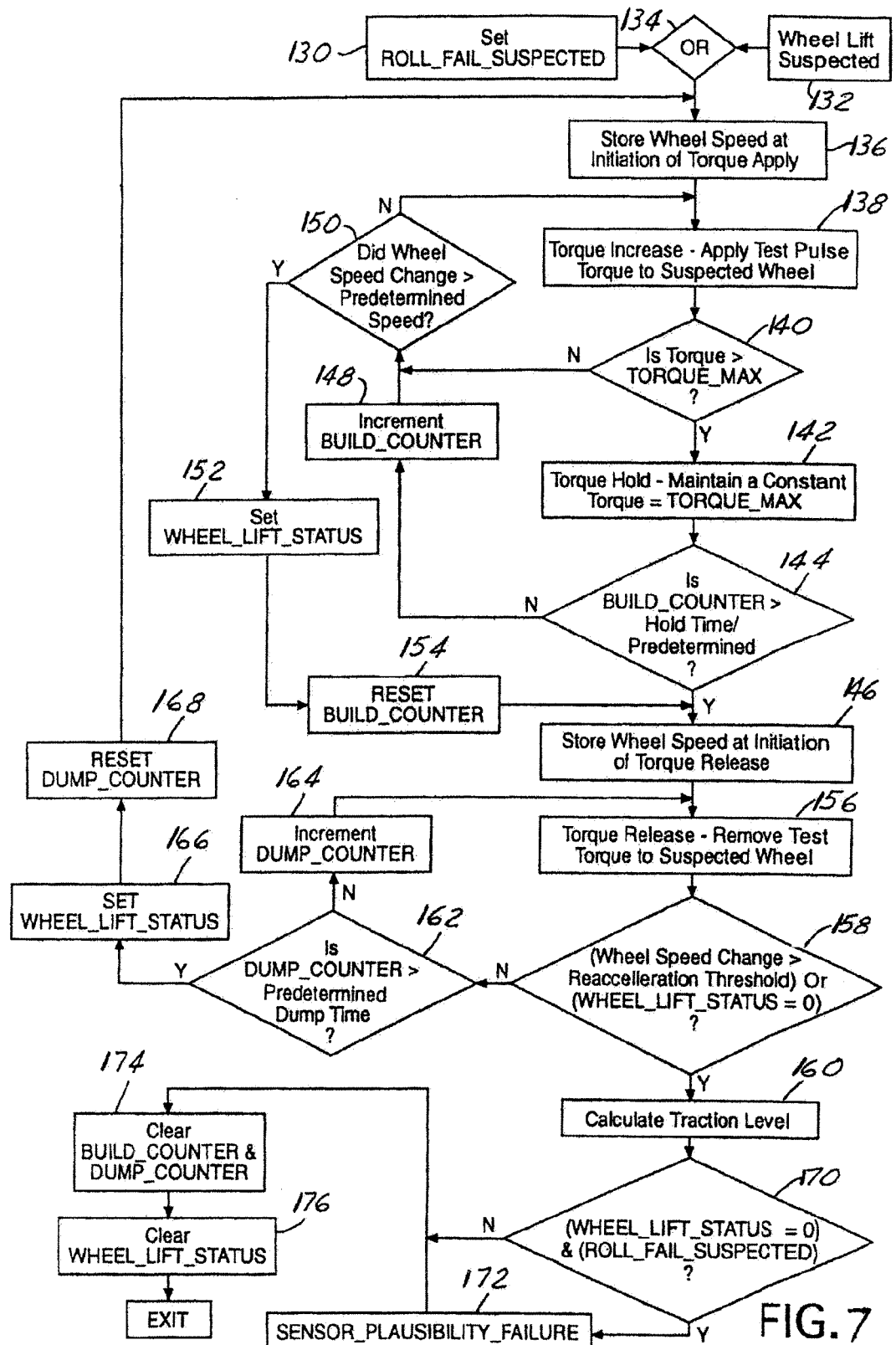
FIG. 7 is a flow chart of an active wheel lift identification system according to one embodiment of the present invention.

Referring now to FIG. 7, the active wheel lift detector 60 is used to perform the following method and generate an active wheel lift signal. In step 130, if a roll sensor failure is suspected or in step 132 if wheel lift is suspected by the roll control system, block 134 initiates the wheel lift determination process. In step 136, torque is applied to the wheel suspected of lifting and the wheel speed at the suspected wheel is stored. In step 138, the torque is increased by applying a test pulse of torque to the suspected wheel. Torque is applied until a torque threshold (Torque_Max) is achieved. In step 140, if the torque is greater than the Torque_Max, the torque is held constant in step 142. In step 144, if the time as counted by the Build_Counter is greater than a predetermined time, step 146 is executed in which the torque is released and the wheel speed at the initiation of the release of torque is stored. In step 144, if the counter is not greater than the predetermined hold time, the counter is incremented in step 148. After step 148 the change in wheel speed is compared to a predetermined change in wheel speed. If the wheel speed change is not greater than a predetermined speed in step 150, steps 138-144 are again executed. If the wheel speed change is greater than a predetermined speed, this indicates a lifted wheel. In this case, step 152 is executed in which a wheel lift status flag is set. After step 152, step 154 is executed in which the build counter is reset.

Referring back to step 140, if the torque is not greater than the torque threshold then step 150 is executed.

Referring back to step 146, after the wheel speed is recorded after the torque release, step 156 is executed. In step 156 torque is released. After step 156, step 158 is implemented in which the wheel speed change is compared to a reacceleration threshold. The reacceleration threshold is a predetermined value that corresponds to a wheel speed change that should be achieved should wheel contact be reestablished. The wheel speed change is determined from the time that the torque was released. If the wheel speed change is greater than a reacceleration threshold or if the wheel lift status from step 152 is zero, wheel contact is assumed. In such a case the traction level may be calculated in step 160. If the wheel speed does not increase over the reacceleration threshold, then the wheel lift status is confirmed beginning with step 170.

Referring back to step 158, if the wheel speed is less than the reacceleration threshold, step 162 compares the Dump_Counter to a predetermined dump time. If the predetermined dump time is greater than the Dump_Counter, then the Dump_Counter is incremented in step 164 and steps 156 and 158 are again executed. If the Dump_Counter is greater than the predetermined dump time, then the wheel lift status flag is set in step 166 and the Dump_Counter is reset in step 168. After step 168, the process is reinitiated and returns to step 136.

Returning back to step 160, the traction level is calculated in step 160. After step 160, the plausibility of a sensor failure is determined. If, for example, the process was initiated based on the suspicion of a sensor failure from block 130 above and no wheel lift was detected, a sensor failure is indicated in step 172. For either result, if a sensor failure is indicated by block 170 or not, the build counter and Dump_Counter are cleared in block 174 and the wheel lift status is cleared in block 176. The end of the routine occurs in block 178.

Thus, as can be seen, the application of torque can be used to first determine whether a suspected wheel has lifted from the pavement. For confirmation, the removal of the torque and the resulting wheel speed change may be used to confirm the initial finding. Advantageously, the system may be implemented in a dynamic stability system of an automotive vehicle without adding further sensors. If rollover is detected, then the rollover can be corrected by applying the brakes or generating a steering correction.

Figure 8A:
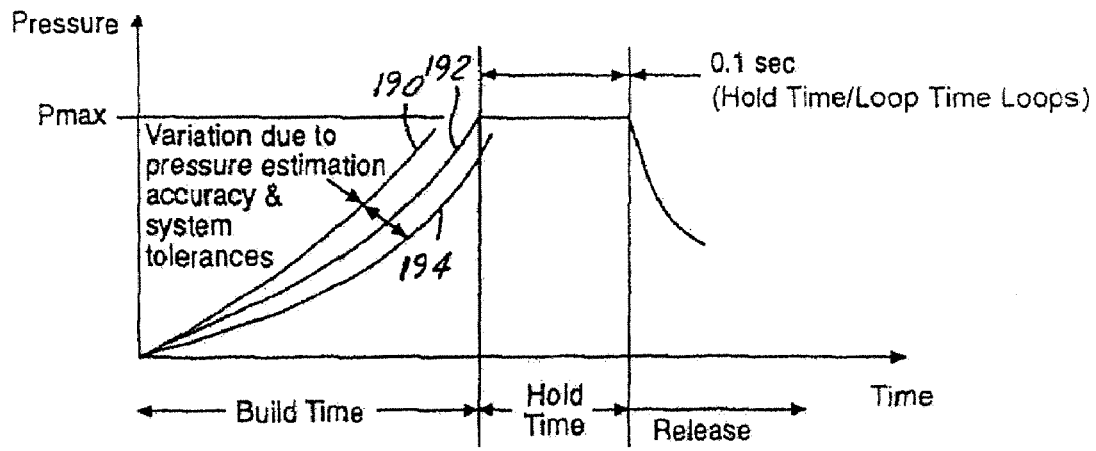
FIG. 8A is a plot of pressure versus time for a wheel lift identification system according to one embodiment of the present invention.

Referring now to FIG. 8A, various lines 190, 192, 194 are illustrated during the build time to illustrate the variation in pressure of the braking system due to wear and other effects of the brakes. Lines 190, 192, 194 have little effect on the overall operation of the system. Thus, the thresholds and parameters are selected so that the system is robust to wear and system variation. The maximum pressure $p_{max}$ is reached and maintained for a hold time (such as set forth in step 42 above) until it is released.

Figure 8B:
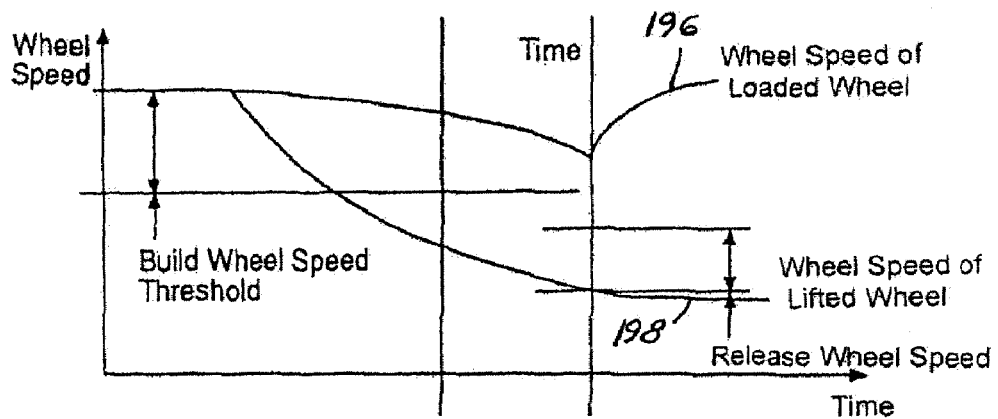
FIG. 8B is a plot of wheel speed versus time for a wheel lift identification system according to one embodiment of the present invention.

Referring now to FIG. 8B, a plot of wheel speed corresponding to the various times is illustrated. As shown, the wheel speed of a loaded wheel is illustrated by line 196, which is higher than the wheel speed of a lifted wheel illustrated by line 198.

Passive Wheel Lift Using Torques

Figure 9:
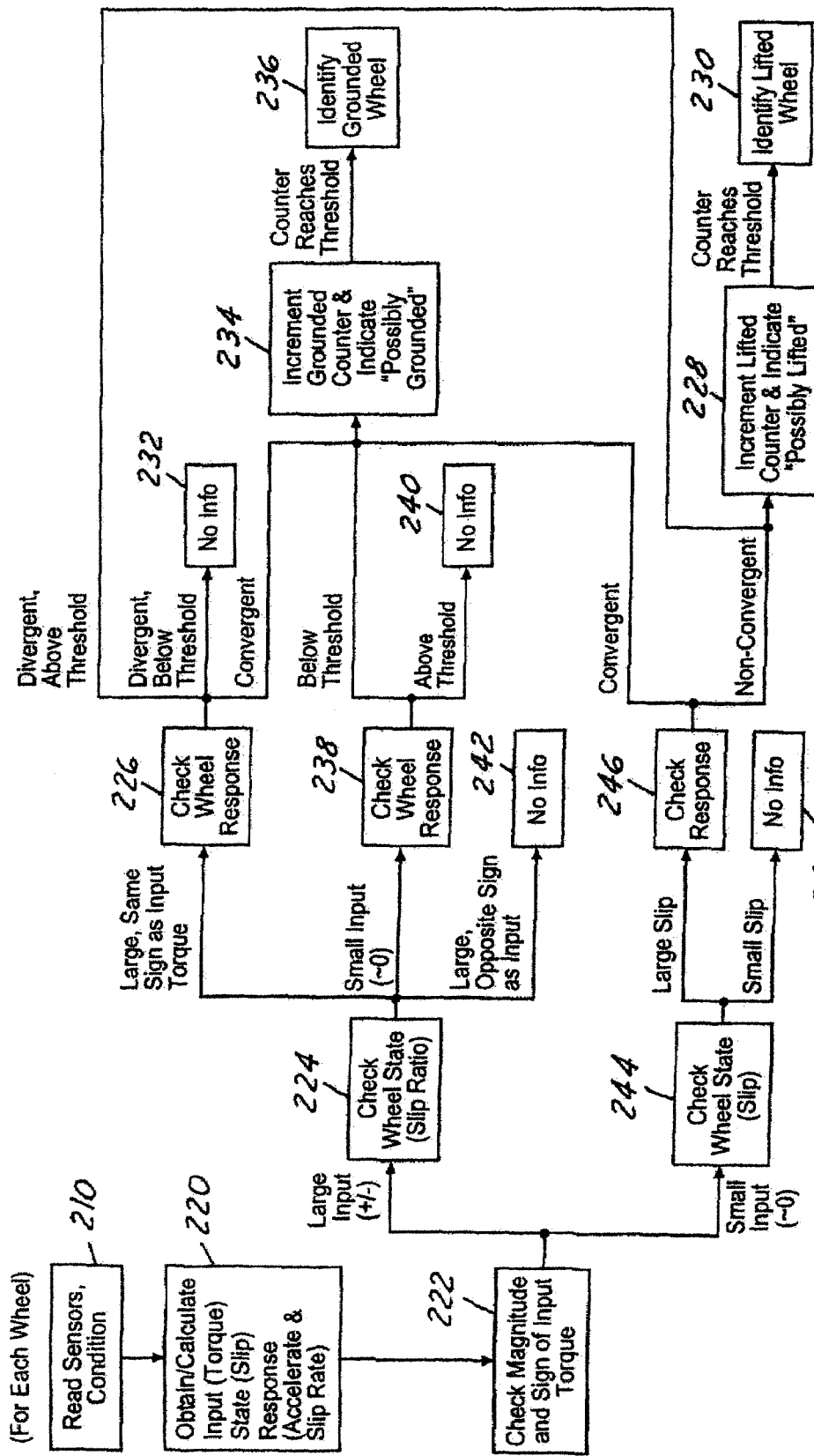
FIG. 9 is a flow chart illustrating a plot of a passive wheel lift detection using the operating torque of the vehicle.

Referring now to FIG. 9, a passive method similar in theory to the active method is hereinafter described. That is, rather than applying a changing torque to the wheel, an operating input torque to the wheel may be used. This passive determination may be used in the method of FIG. 6 described above. Thus, the operating input torque to the wheel is an unmodified wheel torque from those of the normal operating conditions in contrast to that described in the parent application U.S. Pat. No. 6,356,188, which is incorporated by reference herein. Consequently, the passive system described below can accommodate the type of normal operating wheel torque, from low or near zero, to negative (braking) or positive (accelerating). It should be noted that each wheel may be subject to this method.

In step 210, the various sensors in vehicle conditions are read. The following process is performed for each of the wheels. In step 220, the various inputs to the method are obtained and calculated. The input torque may be measured by a separate sensor or may be determined using the engine torque. The operating input torque to the wheel is a function of the engine speed, and the distribution of the engine torque to the wheels through a torque transferring system such as a differential and driveline. Thus, the operating input torque may be determined without being modified. In contrast to an active system, the active system must have and generate a change in torque. The slip ratio of each wheel is also determined. The wheel slip ratio is determined by the difference of the wheel speed minus the velocity of the corner divided by the vehicle speed at the corner. Thus, the wheel slip ratio is a unitless ratio. The velocity at each corner of the vehicle may be determined from the wheel speed sensors described above or may be a function of the yaw rate to account for the turning of the vehicle. Thus, the yawing of the vehicle and the speed at the vehicle may be used to determine the vehicle velocity at the corner of the vehicle.

In step 220, the wheel acceleration and the slip rate of the vehicle may also be determined. The vehicle slip rate is the change in the slip ratio described above. That is, the slip ratio derivative is used to determine the slip rate. However, the velocity at each corner of the vehicle multiplied by the derivative of the slip ratio may also be used as the slip rate. It has been found in practice that this method for determining the slip rate results in a cleaner signal, which is advantageous in signal processing.

In step 222, the magnitude and sign (or direction) of the input torque is determined. In step 224, if a large magnitude of input torque is provided (not near zero) step 224 is executed. Step 224 checks the wheel slip ratio. The sign or relative direction of wheel slip ratio and the magnitude of the wheel slip ratio is compared to thresholds. If the wheel slip ratio is greater than a predetermined magnitude and it has the same sign as the input torque, step 226 is executed.

In step 226, the wheel response is determined. The wheel response may be determined using the wheel acceleration, the wheel slip rate, or both. The wheel response and the wheel slip ratio are compared to a threshold. The threshold may be a function of the input torque. The terms divergent and convergent are also used. Divergent means that the values are trending away from zero, while convergent means the values are trending toward zero. In step 226, if the wheel acceleration and slip rate are both divergent and above predetermined corresponding thresholds, step 228 is executed in which a possibly lifted counter is incremented. If this condition holds for a number of cycles, step 230 generates a lifted wheel signal indicative that the wheel has lifted.

In step 230, other vehicle inertial information may be used to confirm the identity and possibility that the wheel is lifted.

Referring back to step 226, if the wheel acceleration and/or the wheel slip rate is divergent but below a predetermined threshold, step 232 provides no indication to the system. That is, not enough information has been provided.

In step 226, if the wheel acceleration and the wheel slip rate is convergent, step 234 is executed. In step 234 a possibly grounded signal is generated and a grounded counter is incremented. In step 236, if the above condition persists for a predetermined number of cycles, a wheel lifted signal is generated for the wheel.

Referring back to step 224, if the wheel slip is about zero, step 238 is executed. In step 238, if the wheel response is below the threshold, step 234 is executed as described above. The thresholds may be the same as those described above or may be changed due to the change of torque. The threshold may also be constant numerical values. If in step 238 the wheel responses are above the thresholds, no information is provided.

Referring back to step 224, if the wheel slip ratio has a large magnitude but has a sign opposite to the input torque, no information is generated in step 242.

Referring back to step 222, if a small input torque near zero is generated (the absolute value of the input torque is less than a predetermined input torque) the wheel state is checked in step 244. In step 244 the magnitude of the wheel slip is determined. If the wheel slip is above a predetermined threshold, the response of the wheel is checked in step 246. For small torque cases, the wheel response is not likely to be divergent. However, in this case, lack of convergence may be used to indicate that the wheel is not grounded. Note that if the wheel does meet the divergence criteria, it also meets the non-convergent criteria. Thus, if the wheel state is convergent in step 246, step 234 is executed. In step 246, if the wheel response is non-convergent, that is, that significant slip is present and the wheel does not have significant acceleration of opposite sign compared to the slip ratio, step 228 is executed. If a smaller input torque and a small wheel slip is present from step 224, step 248 indicates no information.

The no information blocks 232, 240, 242, and 248 are all used to provide no indication of wheel lift. This is because insufficient evidence or conflicting evidence is present.

One advantage of this passive wheel lift determination is that the computations may be run at all times and is generally independent of the inertial state information.

Arbitration Between Active and Passive Wheel Lift

The passive wheel lift detection strategy (PWLD) checks all the available motion variables at each time instant to determine if a suspicious wheel is lifted. The advantage of PWLD over AWLD is that the former could send an indication at each time instant, and the latter needs to wait a certain period of time before sending out an indication. Another advantage is that during driver braking, PWLD can be used effectively to identify wheel lifting. However PWLD, in some cases, suffers a lack of information to determine the wheel lifting status if the wheel slip is not disturbed enough and sufficient torque is not present.

Therefore, it is desirable to integrate active and passive wheel lift together so as to conduct a reliable wheel lift determination. The final wheel lift status may be used for activating the roll stability control system or updating various parameters.

The passive wheel lift detection (PWLD) system generates the wheel lifting status $S_{wld\text{-}passive}(i)$ for the ith wheel, which could be any of the following five statuses. The following statuses are set forth in an order from high to low. The statuses may actually be implemented as a number in the logic of the control scheme. For example "4" may represent absolutely grounded while "0" represents no indication.

If the ith wheel is absolutely grounded, then $S_{wld\text{-}passive}(i)$=ABSOLUTELY_GROUNDED If the ith wheel is in the edge of grounding, $S_{wld\text{-}passive}(i)$=POSSIBLY_GROUNDED If the ith wheel is absolutely lifted, then $S_{wld\text{-}passive}(i)$=ABSOLUTELY_LIFTED If the ith wheel is in the edge of lifting $S_{wld\text{-}passive}(i)$=POSSIBLY_LIFTED If the ith wheel's status cannot be confirmed, then $S_{wld\text{-}passive}(i)$=NO_INDICATION As mentioned above there are numerous methods for determining passive wheel lift detection for setting $S_{wld\text{-}passive}(i)$.

Active Wheel lift detection, as described above is intended to be an independent means of determining whether a wheel is lifted or not. By independent, it is meant that the detection method does not rely on the signals used to detect the roll state of the vehicle (i.e., roll rate and angle, lateral acceleration, steering wheel angle, vehicle speed, steering wheel angle). Basically, the operation of the algorithm is broken into a Build Cycle, in which brake pressure is applied to the wheel, and a Release Cycle, in which brake pressure is removed from the wheel. In the Build and Release Cycles, the slip ratio and rate of wheel speed change is compared to a physical model of a lifted and a grounded wheel, in order to determine the Lift State.

The intent of the Build cycle is to apply brake pressure to the wheel in order to (i) generate negative slip on the wheel. Typically slip ratios less than (more negative than) −15 to −20% are required to assess if a wheel is lifted. Furthermore, slip ratios of this magnitude are required to assess the Lift State of the wheel in the Release Cycle; (ii) Examine the rate of wheel speed change as a function of brake pressure and engine torque during the build cycle.

The intent of the Release cycle is to remove brake pressure on the wheel (Upon Entering Release Initial, the requested pressure on the wheel is set to zero) and (i) examine the rate of wheel speed change as a function of residual brake pressure and engine torque; (ii) Examine the change in slip ratio as a function of the release counters (i.e., time in release).

The active wheel lift detection system generated the wheel lifting status $S_{wld\text{-}active}(i)$ for the ith wheel.

A simple arbitration between $S_{wld\text{-}passive}(i)$ and $S_{wld\text{-}active}(i)$ to provide a final wheel lifting status $S_{wld}(i)$ can be expressed as in the following

```
for (i = 0; i ≤ 3; i++)
{
    if(S_wld-active(i) == ABSOLUTELY_GROUNDED)
        S_wld(i) = ABSOLUTELY_GROUNDED;
    else if(S_wld-active(i) == ABSOLUTELY_LIFTED)
        S_wld(i) = ABSOLUTELY_LIFTED;
    else if(S_wld-passive(i) == ABSOLUTELY_GROUNDED)
        S_wld(i) = ABSOLUTELY_GROUNDED;
    else if(S_wld-passive(i) == ABSOLUTELY_LIFTED)
        S_wld(i) = ABSOLUTELY_LIFTED;
    else if(S_wld-active(i) == POSSIBLY_GROUNDED)
        S_wld(i) = POSSIBLY_GROUNDED;
    else if(S_wld-active(i) == POSSIBLY_LIFTED)
        S_wld(i) = POSSIBLY_LIFTED;
    else if(S_wld-passive(i) == POSSIBLY_GROUNDED)
        S_wld(i) = POSSIBLY_GROUNDED;
    else if(S_wld-passive(i) == POSSIBLY_LIFTED)
        S_wld(i) = POSSIBLY_LIFTED;
    else
        S_wld(i) = NO_INDICATION;
}
```

Although the above simple integration scheme provides an envelope for both active and passive wheel lifting status, no conflict resolution is provided. In the logic above, i refers to the wheel number. The front left wheel is 0, the front right wheel is 1, the rear left wheel is 2, and the rear right wheel is 3. Thus, wheels 0 and 2 are on the same side (left in this case) of the vehicle while wheels 1 and 3 are on the same side (right in this case) of the vehicle. In the above logic, if the active wheel lift signal is absolutely grounded, the final wheel lift status is set to be absolutely grounded. If the above is not true and the active wheel lift status is absolutely lifted the final wheel lift status is set to absolutely lifted. If the above is not true and the passive wheel lift status is absolutely grounded, then the final wheel lift status is absolutely grounded. If the above is not true and the passive wheel lift status is absolutely lifted then the final wheel lift status is set to be absolutely lifted. If the active wheel lift status is possibly grounded and the above is not true, then the final wheel lift status is set to be possibly grounded. If the above is not true and the active wheel lift status is possibly lifted then the final wheel lift status is set to possibly lifted. If the above is not true and the passive wheel lift status is possibly grounded, then the final wheel lift status is said to be possibly grounded. If the above is not true and the passive wheel lift status is possibly lifted, then the final wheel lift status is set to be possibly lifted. If any of the above are not true then the final wheel lift status is set to no indication.

For example, such an integration does not distinguish between a conflict between $S_{wld-passive}(i)$ and $S_{wld-active}(i)$. The following conflict removing logic (CRL) which is part of the logic programmed into integrated wheel lift detector 62 sets the final wheel lifting status $S_{wld}(i)$ to NO_INDICATION instead of sending out a potentially wrong status

```
for (i = 0; i ≤ 3; i++)
{
    if( (S_wld-active(i) ≤ POSSIBLY_GROUNDED &&
         S_wld-passive(i) ≥ POSSIBLY_LIFTED)
      || (S_wld-active(i) ≥ POSSIBLY_LIFTED &&
         S_wld-passive(i) ≤ POSSIBLY_GROUNDED)
    )
        S_wld(i) = NO_INDICATION;
}
```

In the above logic, when the active wheel lift status is less than or equal to possibly grounded and the passive wheel lift is greater than or equal to possibly lifted for the same wheel, or the active wheel lift is greater than or equal to possibly lifted and the passive wheel lift signal is less than or equal to possibly grounded then no indication is provided. As can be seen, this logic provides a conflict check between the passive wheel lift signal and the active wheel lift signal for each of the wheels.

Due to different suspension systems, some vehicle may have earlier front wheel lifting and a delayed rear wheel lifting; others may have rear wheel lifting first and then the front wheel lifting. In this case a consistence check for the final wheel lift status can be conducted as in the following CONSISTENCY CHECK LOGIC (CCL). If a vehicle has earlier front wheel lifting

```
if( S_wld(0) ≤ POSSIBLY_GROUNDED
    && &S_wld(2) ≥ POSSIBLY_LIFTED
)
{
    S_wld(0) = NO_INDICATION;
    S_wld(2) = NO_INDICATION;
}
if( S_wld(1) ≤ POSSIBLY_GROUNDED
    && &S_wld(3) ≥ POSSIBLY_LIFTED
)
    S_wld(1) = NO_INDICATION;
    S_wld(3) = NO_INDICATION;
}
```

In the above logic, the final wheel lift status for both sides of the vehicle are checked. On the left side of the vehicle if the wheel lift status of the front wheel is less than or equal to possibly grounded and the rear wheel is greater than or equal to possibly lifted, both of the final wheel lift statuses for both the front and the rear wheels of the left side of the vehicle are set to no indication. The same is true for the right side of the vehicle.

If a vehicle has earlier rear wheel lifting

```
if( S_wld(2) ≤ POSSIBLY_GROUNDED
    && &S_wld(0) ≥ POSSIBLY_LIFTED
)
{
    S_wld(0) = NO_INDICATION;
    S_wld(2) = NO_INDICATION;
}
if( S_wld(3) ≤ POSSIBLY_GROUNDED
    && &S_wld(1) ≥ POSSIBLY_LIFTED
)
    S_wld(1) = NO_INDICATION;
    S_wld(3) = NO_INDICATION;
}
```

Both the right side of the vehicle and the left side of the vehicle are checked in the above logic. If the final wheel lift status for the rear wheel is less than or equal to possibly grounded and the front left wheel is greater than or equal to possibly lifted, then both of the front and rear wheel final wheel lift statuses are set to no indication. The same is true for the right side of the vehicle as well.

If the vehicle relative roll angle is very small and the roll rate signal tries to decrease the relative roll angle, then another consistency check logic (CCL) can be conducted. If the vehicle is turning left

```
if( θ_xr ≧ 0 & &θ_xr ≦ Θ & &w_x ≦ 0 )
{
    if(S_wld(0) ≧ POSSIBLY_LIFTED)
    {
        S_wld(0) = NO_INDICATION;
    }
    if(S_wld(2) ≧ POSSIBLY_LIFTED)
    {
        S_wld(2) = NO_INDICATION;
    }
}
```

In the above logic, if the roll angle is greater than 0 and the roll angle is less than or equal to a threshold, indicative that the roll angle is small, and the roll rate is less than or equal to 0 and the final wheel lift status of the front left wheel is greater than or equal to possibly lifted, then no indication is provided. Likewise, if the final wheel lift status of the left rear wheel is greater than or equal to possibly lifted then no indication is provided. As can be seen by the logic immediately below, the relative roll angle, the threshold and the roll rate may be used to detect a consistency in the right side of the vehicle. That is, if the relative roll angle $\theta_{xr}$ is less than or equal to 0 and the relative roll angle is greater than or equal to the negative relative roll angle threshold and the roll rate is greater than or equal to 0, and if the final wheel lift status of the front right wheel greater than or equal to possibly lifted, no indication is provided. The same check is performed for the rear wheel.

If the vehicle is turning right

```
if( θ_xr ≦ 0 & &θ_xr ≧ -Θ & &w_x ≧ 0 )
{
    if(S_wld(1) ≧ POSSIBLY_LIFTED)
    {
        S_wld(1) = NO_INDICATION;
    }
    if(S_wld(3) ≧ POSSIBLY_LIFTED)
    {
        S_wld(3) = NO_INDICATION;
    }
}
```

Considering the roll stability control system applies braking pressure to the front wheels during the initial stage of pressure build-up, braking pressure for active wheel lift detection on the other wheel that shares a brake circuit with the RSC control wheel is terminated so as to guarantee all the brake fluid in the brake circuit will be used to build control pressure. Hence if the vehicle has a front-rear split braking system, the following pressure inhibit logic (PIL) will be used to turn off active wheel lift detection (AWLD)

```
if(P_RSC(0) ≦ P_est(0) + Y)
{
    Turn off AWLD at wheel 1;
    S_wld(1) = S_wld-passive(1)
}
if(P_RSC(1) ≦ P_est(1) + Y)
{
    Turn off AWLD at wheel 0;
    S_wld(0) = S_wld-passive(0)
}
``` where $P_{RSC}(i)$ is the rollover stability control system request braking pressure at front wheels, $P_{est}(i)$ is the estimated caliper pressure, and Y is a pressure offset. As can been seen by the above logic, if either of the pressure requested by the front wheels is less than or equal to an estimated caliper pressure plus an offset, the final wheel status of either of the front wheels is then set to the passive wheel status. Therefore, the active wheel check for the particular wheel is disabled.

If the vehicle has a diagonal split braking system, the following pressure inhibit logic (PIL) will be used to turn off active wheel lift detection (AWLD).

```
if(P_RSC(0) ≦ P_est(0) + Yr)
{
    Turn off AWLD at wheel 1;
    S_wld(1) = S_wld-passive(1)
}
if(P_RSC(1) ≦ P_est(1) + Y)
{
    Turn off AWLD at wheel 0;
    S_wld(0) = S_wld-passive(0)
}
```

Considering that during driver braking, the torque disturbance is enough to initiate a solid PWLD result, the following driver braking detection integration logic (DBDIL) is conducted

```
if(DRIVER_BRAKING_FLAG == 1
    & &P_driver ≧ Ψ)
{
    Turn off AWLD at wheel i;
    S_wld(i) = S_wld-passive(i)
}
``` where Ψ is a threshold for driver braking pressure $P_{driver}$.

Thus, as can be seen by the above logic, if the driver or vehicle operator applies the brakes a braking flag will be generated. If the brake pressure requested by the driver is above a threshold then active wheel lift is disabled for the wheel. That is, the final wheel status is set to the passive wheel status.

Considering that during a large driving torque application (for example, wide open throttle case), there are enough wheel torque disturbance to initiate a solid PWLD result, the following open throttle detection integration logic (OTDIL)

```
if(OPEN_THROTTLE_FLAG == 1
    & &τ_driving(i) ≧ Γ)
{
    Turn off AWLD at wheel i;
    S_wld(i) = S_wld-passive(i)
}
``` where $\tau_{driving}(i)$ is the positive driving torque applied to the ith wheel due to engine torque and Γ is the threshold for $\tau_{driving}(i)$.

As the above logic shows, when the driving torque for a particular wheel due to engine is compared to a threshold, which indicates a throttle status such as wide open throttle, the active wheel lift detection is disabled. That is, the final wheel lift status Swld is set to the passive wheel lift status.

Angle Corrections from Wheel Lift/Grounded Determination

Figure 10:
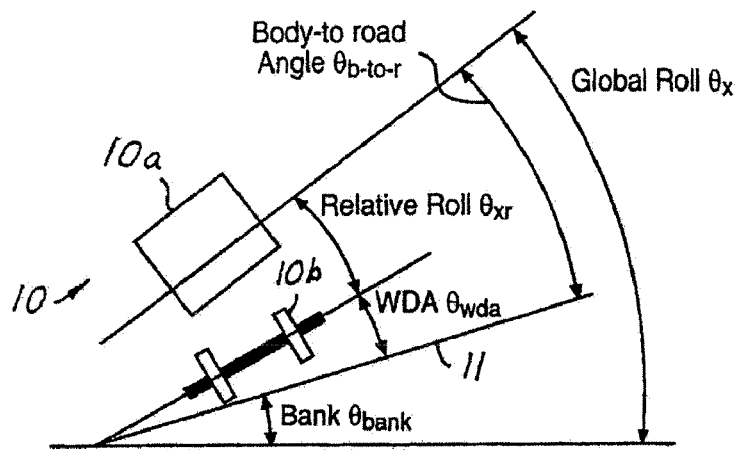
FIG. 10 is an end view of an automotive vehicle on a bank.

Referring now to FIG. 10, the relationship of the various angles of the vehicle 10 relative to the road surface 11 is illustrated. In the following a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll angle (as the one in U.S. application Ser. No. 09/789,656, which is incorporated by reference herein). If all things were slowly changing without drifts, errors or the like, the linear bank angle and reference road bank angle terms would be equivalent.

Figure 11:
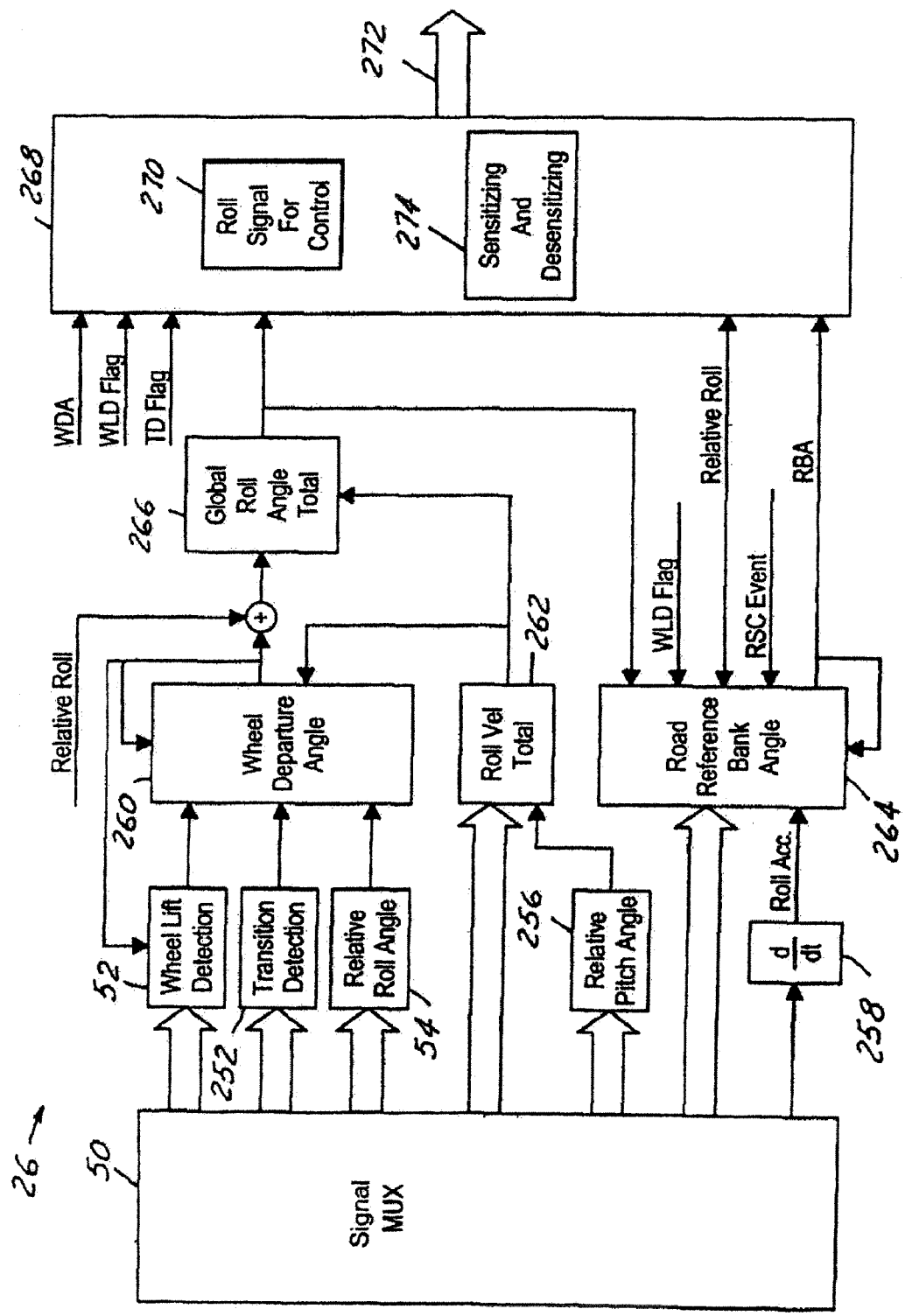
FIG. 11 is a block diagrammatic view of the controller.

Referring now to FIG. 11, controller 26 is illustrated in further detail. The controller 26 receives the various sensor signals 20, 28-39. From the various sensor signals wheel lift detection may be determined. The modules described below (and above) may be implemented in hardware or software in a general purpose computer (microprocessor). From the wheel lift detection module 52, a determination of whether each wheel is absolutely grounded, possibly grounded, possibly lifted, or absolutely lifted may be determined, as described above. Transition detection module 252 is used to detect when the vehicle is experiencing aggressive maneuver during a transition turn from the left to right or right to left. The sensors may also be used to determine a relative roll angle in relative roll angle module 54. Relative roll angle may be determined in many ways. One way is to use the roll acceleration module 258 in conjunction with the lateral acceleration sensor (see U.S. Pat. No. 6,556,908 incorporated by reference herein) for detail. As described above, the relative roll angle may be determined from the roll conditions described above.

The various sensor signals may also be used to determine a relative pitch angle in relative pitch angle module 256 and roll acceleration in roll acceleration module 258. The outputs of the wheel lift detection module 50, the transition detection module 52, and the relative roll angle module 54 are used to determine a wheel departure angle in wheel departure angle module 260. Various sensor signals and the relative pitch angle in relative pitch angle module 256 are used to determine a relative velocity total in module 262. The road reference bank angle step 264 determines the bank angle. The relative pitch angle, the roll acceleration, and various other sensor signals as described below are used to determine the road reference bank angle. Other inputs may include a roll stability control event (RSC) and/or the presence of a recent yaw stability control event (WLDFlag).

The global roll angle of the vehicle is determined in global roll angle module 266. The relative roll angle, the wheel departure angle, and the roll velocity total blocks are all inputs to the global roll angle module 266. The global roll angle block determines the global roll angle $\theta_x$. An output module 68 receives the global roll angle module 266 and the road reference bank angle from the road reference bank angle module 264. A roll signal for control, which will be directly used in generating control command from the feedback control law, is developed in roll signal module 270. The roll signal for control is illustrated as arrow 272. A sensitizing and desensitizing module 74 may also be included in the output module 68 to adjust the roll signal for control.

In the reference road bank angle module 264, the reference bank angle estimate is calculated. The objective of the reference bank estimate is to track the true road bank angle experienced during driving in both stable and highly dynamic situations. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal of the roll controller 26.

The roll signal for control is calculated as the $(\theta_x-\theta_{refbank})$, i.e., the subtraction of the reference bank angle from the global roll angle.

As mentioned above various errors not limited to integration, calculation and drift may enter into the various signals at various times. Thus, in certain situations the wheel departure angle or the reference bank angle may not be accurate. The following description describes how these values can be updated in response to wheel lift/wheel grounded values.

As described above, wheel lift detection includes both detecting that the wheels are grounded and that the wheels are lifted. These conditions are relatively certain and thus may be used to update certain calculated values such as the reference roll angle and the wheel departure angle.

Figure 12:
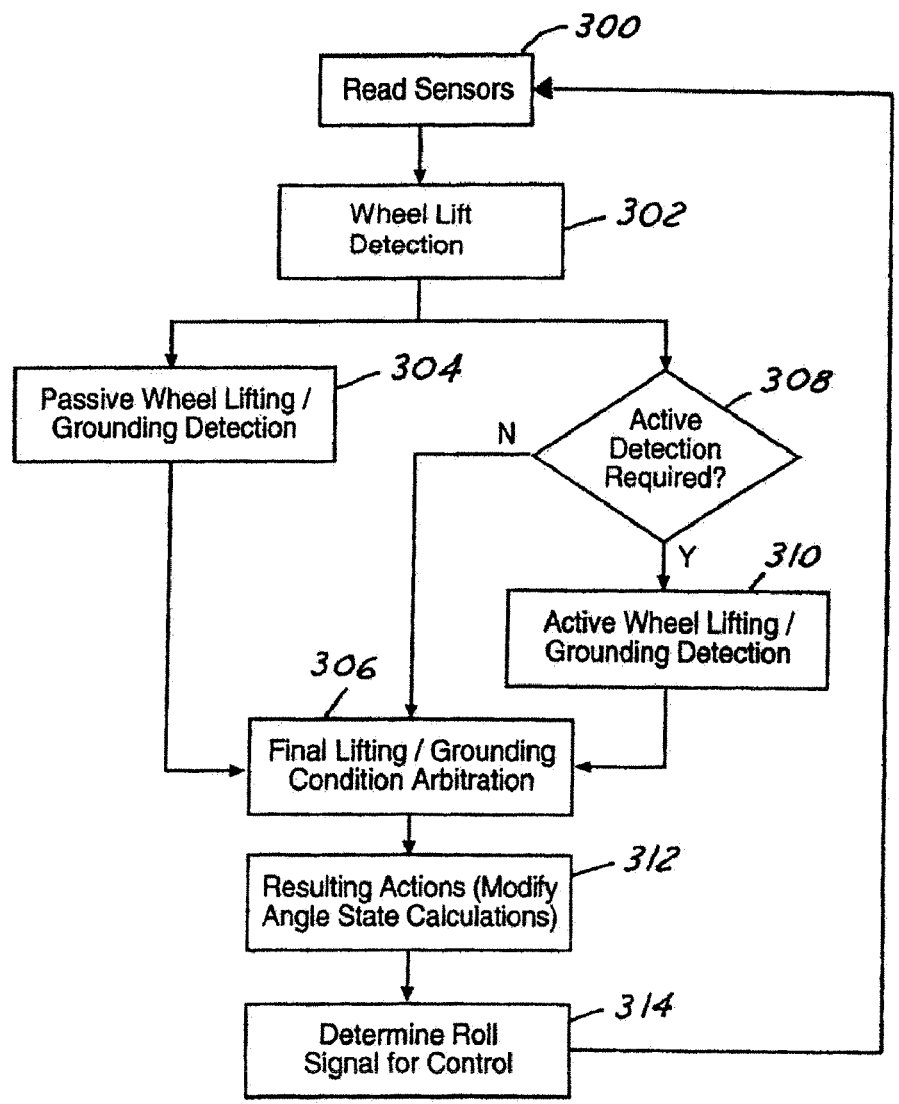
FIG. 12 is a high level flow chart illustrating condition detection and the resulting actions.

Referring now to FIG. 12, a high level flow chart illustrating the condition detection and the resulting actions according to this embodiment of the present invention is illustrated. In step 300 various sensors described above are read. In step 302 various method selections based upon the particular drive train are determined. For example, the method selection may adjust the various factors based upon the presence and condition of the center differential. This step will be further described in FIG. 13.

In step 304, passive wheel lifting/grounding detection is determined. Thereafter, in step 306, a final lifting/grounding condition arbitration is performed.

Referring back to step 302, a parallel process to that of step 304 is described. In step 308 it is determined whether or not active detection is required. If active detection is not required step 306 is performed. If after detection is required, step 310 performs active wheel lift/grounding detection. Thereafter, step 306 arbitrates between the lifting and grounding conditions as described above. The arbitrated condition for each of the wheels of the vehicle is determined. After step 306, the resulting actions from the wheel lifting/grounding conditions are determined. Step 304 is further described in FIG. 14. Step 310 is further described in FIG. 15 and step 312 is further described in FIG. 16.

As shown in step 268 of FIG. 11, the roll signal for control is ultimately determined. The roll signal for control is a function of the global roll angle and the reference roll angle. The reference bank angle may also be adjusted in response to the wheel departure angle and the relative roll angle generated from a linear roll dynamics model as will be further described below.

Figure 13:
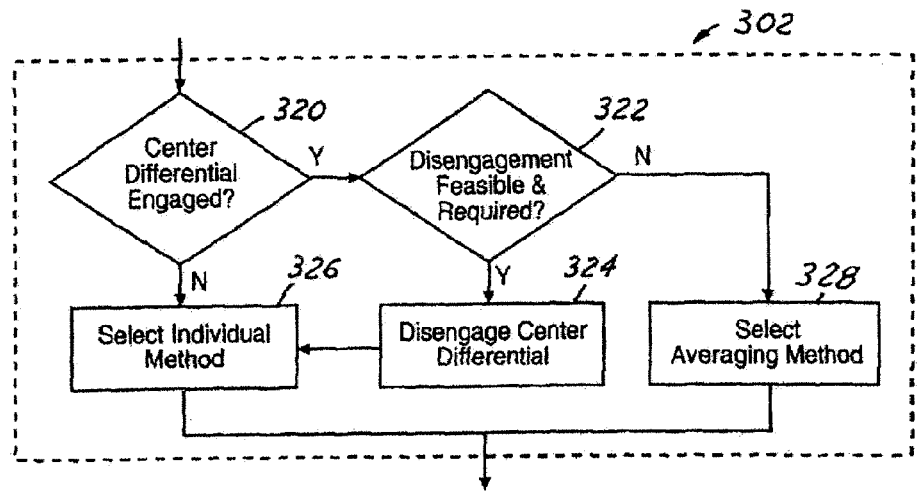
FIG. 13 is a flow chart of a drive train based decision step 302 of FIG. 12.

Referring now to FIG. 13, step 320 describes whether a center differential is engaged. If the center differential is engaged in step 320, step 322 determines whether or not this engagement is feasible or required. If the disengagement is not feasible or required then step 328 selects an averaging method for the two sides of the vehicle.

When the vehicle is in 4×4 mode, the front and rear axles are coupled through the driveshaft. This drivetrain coupling results in an unknown front/rear torque split and causes transient oscillations of the wheels. These factors prevent an accurate evaluation of lift for each wheel end, but lift can still be evaluated by treating the wheels on each side of the vehicle as a two-wheel system. By considering all torques on the two-wheel system and looking at the overall system response, a method analogous to the individual wheel method can be used to detect lift.

For each side of the vehicle, the two-wheel system response is determined by averaging the responses of the front and rear wheels on that side. The key change for 4×4 wheel lift detection is that the average wheel speeds and slip values (front averaged with rear for each side of the vehicle) are used instead of values for each individual wheel. The lift is evaluated for each side of the vehicle instead of evaluating each wheel. By the above a robust identification location of two wheel lift is determined. Single wheel life may be identified only when there is a sufficiently low amount of loading on the second wheel.

In step 322 if the disengagement is feasible and required, step 324 disengages the center differential. Thereafter, step 326 is performed. Step 326 is also performed if the center differential is not engaged in step 320. An individual method is used in step 326. That is, individual method selects the individual wheels of the front or rear of the vehicle.

Figure 14:
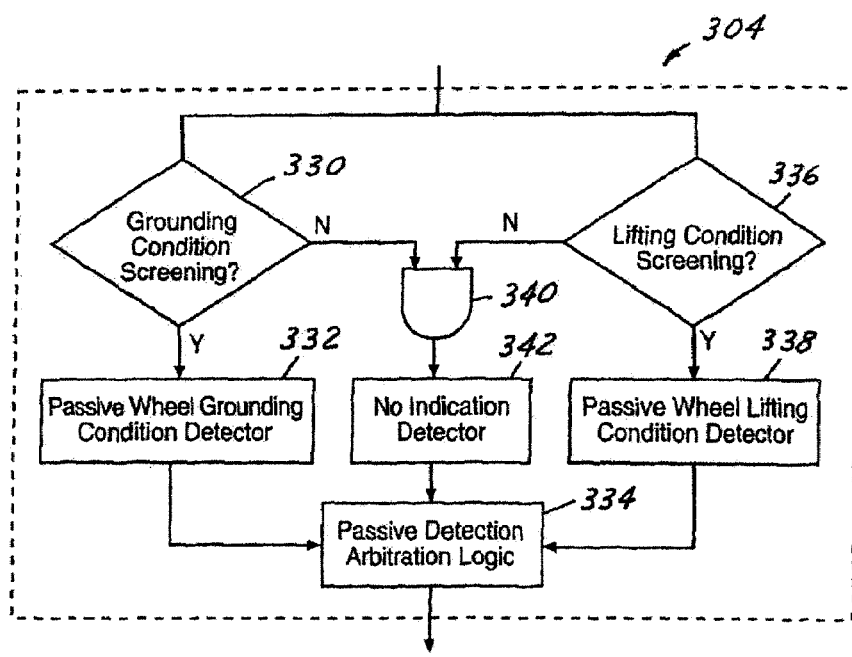
FIG. 14 is a flow chart of the passive wheel lift grounding detection step 304 of FIG. 12.

Referring now to FIG. 14, step 304 above is described in further detail. The grounding/lifting conditions described below may be determined within the wheel lift detection module. In step 330, the grounding condition is screened. If the grounding condition is determined in step 330, the passive wheel grounding condition detector is set. That is, the passive wheel lift being absolutely grounded is determined. In step 334, the passive detection arbitration logic receives the absolutely grounded condition for the wheel. In parallel, the lifting condition is screened in step 336. In step 336, if lifting condition is passively detected in step 338 the output is provided to passive detection arbitration logic 334. In steps 330 and 336, if an absolutely grounded or absolutely lifting condition is not determined, the AND block of step 340 is used to form a no indication detector in step 342. After step 342 the passive detection arbitration logic 334 provides a final passive detection signal. The output of the passive detection arbitration logic 334 is an absolutely lifted condition, possibly lifted condition, an absolutely grounded condition, a possibly grounded condition, or a no indication detector. The no indication detector is generated when the conditions are not absolutely or possibly true. That is, the conditions other than the aforementioned four conditions will be deemed as no indication.

Figure 15:
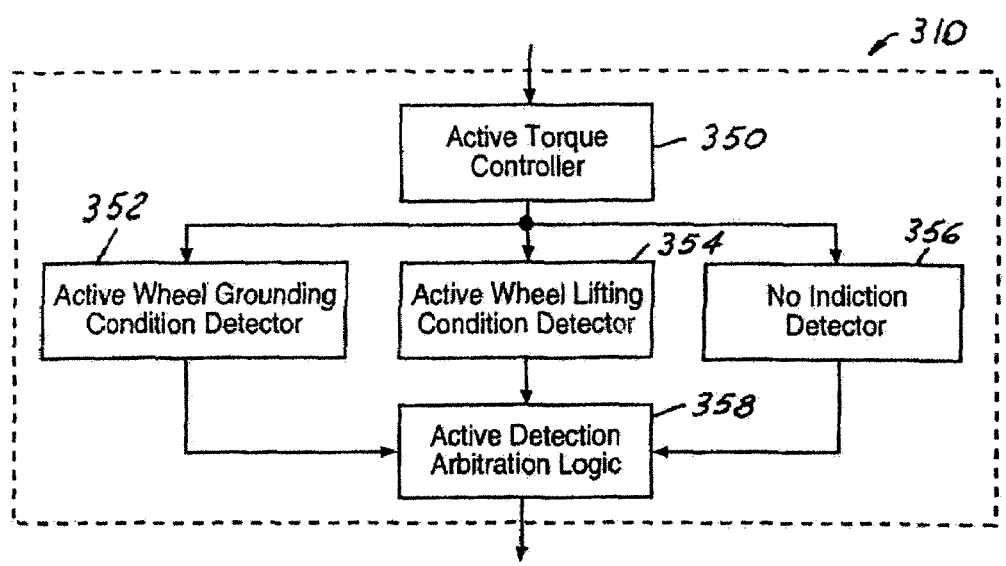
FIG. 15 is a flow chart of the active wheel lift grounding detection step 308 of FIG. 12.

Referring now to FIG. 15, step 350 generates an active torque control. Steps 352, 354 and 356 corresponded to the logic described above. That is, step 352 determines active wheel grounding in response to the active torque provided in step 350. In step 354 active wheel lift is detected and in step 356 a no indication detector is provided. In step 358, the no indication detector is conducted when the conditions are not absolutely or possibly true. The detection arbitration logic in step 358 thus provides an absolutely grounded condition, an absolutely lifted condition, possibly grounded condition, possibly lifted condition or a no indication for each of the wheels.

Figure 16:
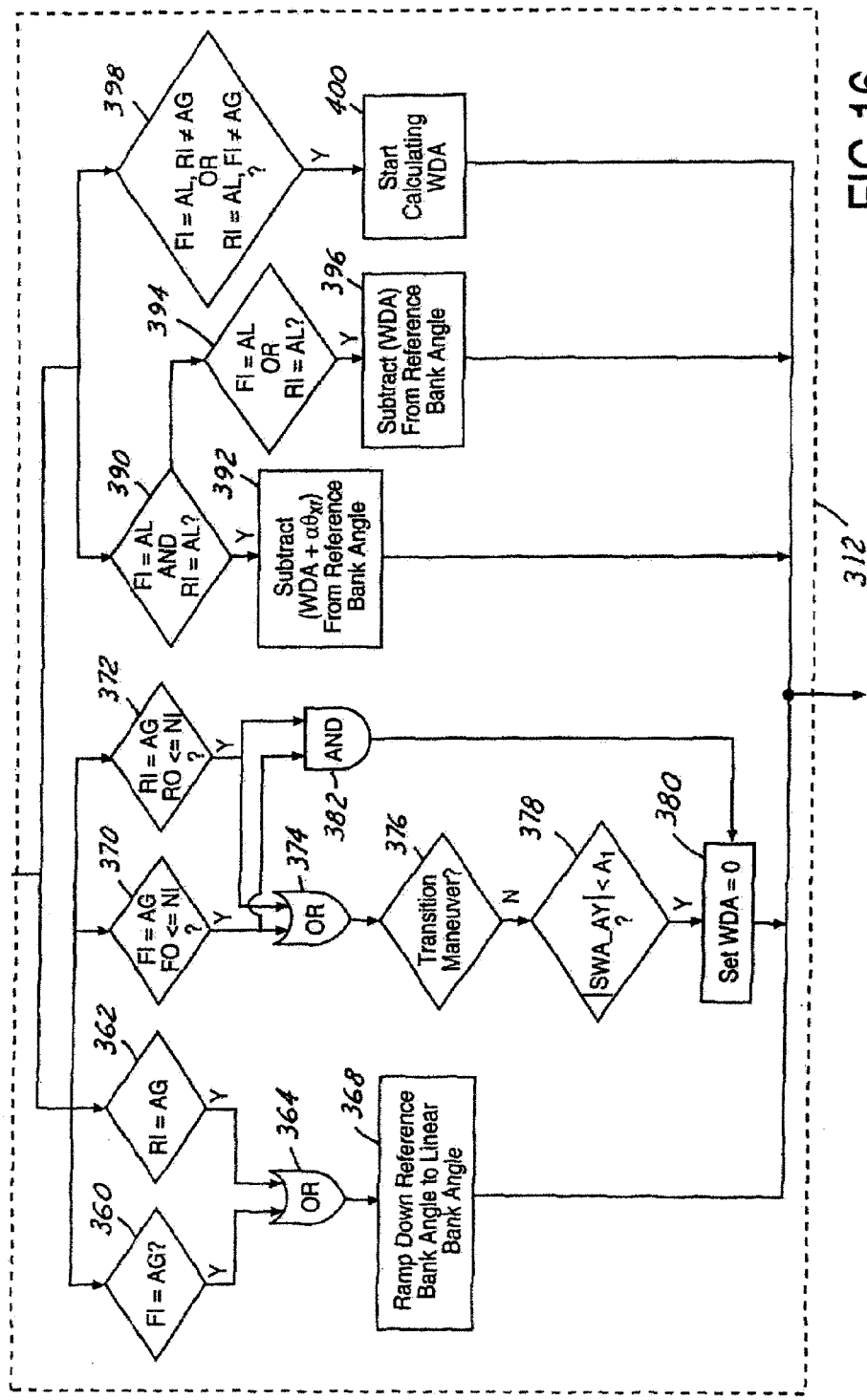
FIG. 16 is a flow chart of the resulting actions step 312 of FIG. 12.

Referring now to FIG. 16, step 312 is illustrated in further detail. In step 312, the terminology illustrated on the figures is as follows: FI is the front inside wheel of the turn, RI is the rear inside wheel of the turn, AG is an absolutely grounded flag, NI indicates no indication, AL indicates absolutely lifted, and WDA is the wheel departure angle. The front inside wheel and the rear inside wheel refer to the position of the wheels while making a turn. Thus, in a left hand turn the front inside wheel would be the left front wheel whereas the left rear wheel would be the rear inside wheel. In a right hand turn the front inside wheel is the front right wheel whereas the rear inside wheel is the rear right wheel.

In steps 360 and 362 the front inside wheel and the rear inside wheel are determined whether or not they are absolutely grounded. If one or the other is absolutely grounded step 364 is executed. Thus, if either one of the front inside wheel or the rear inside wheel is absolutely grounded, step 368 is executed. In step 368 the reference bank angle is ramped down toward the linear bank angle. Although one single adjustment could be made, in a control system it may be desirable to gradually increment the reference bank angle to the linear bank angle. This logic is true because the linear bank angle which is calculated more often than the reference bank angle is a more accurate representation of the road bank than the reference bank angle when at least one of the front or rear inside wheels is absolutely grounded. After step 368, step 314 of FIG. 12 is executed. In step 370 it is determined whether the front inside wheel is absolutely grounded or the front outside wheel is outside is less than or equal to a no indication status. Less than or equal to no indication status indicates absolutely or possibly grounded. In step 372 it is determined the right inside wheel is absolutely grounded and if the rear outside wheel is less than or equal to no indication. The outputs of steps 370 and 372 are provided to an OR gate 374. Thus, if either of the conditions in steps 370 and 372 are true, then it is determined whether or not the system is in a transition maneuver in step 376. A transition maneuver refers to when the system is transitioning or turning from left to right or right to left. If a transition maneuver is not present in step 376, the step 378 is executed. In step 378 the estimated lateral acceleration generated from the steering wheel angle is determined. If such an estimated lateral acceleration magnitude is less than a threshold, step 380 is executed in which the wheel departure angle is set to zero. Thus, the wheel departure angle should not be greater than zero when the system is absolutely grounded.

Referring back to steps 370 and 372, the outputs of these steps are also provided to an AND gate 382. If each of these conditions is true then the wheel departure angle is set to zero in step 380. After step 380, step 314 is executed from FIG. 12. In step 390 the front inside wheel and rear inside wheel are determined if they are absolutely lifted. If these wheels are absolutely lifted the sum of the wheel departure angle and $\alpha\theta_{xr}$ is subtracted from the reference bank angle. The $\alpha$ refers to a boost factor which, in this example, is 1.1. By subtracting this number from the reference bank angle, the roll signal for control angle is increased. This is desirable in a system so that an absolutely lifted condition increases the amount of control provided by the system. If the condition in step 390 is not true, the step 394 is executed. In step 394 if either the front inside wheel is absolutely lifted or the rear inside wheel is absolutely lifted, step 396 is executed in which the wheel departure angle alone is subtracted from the reference bank angle. Thus, this indicates that some increase and the roll signal for control is provided. After step 396, step 314 from FIG. 12 is executed. In step 398 if the front inside wheel is absolutely lifted and the rear inside wheel is not absolutely grounded or the rear inside wheel is absolutely lifted and the front inside wheel is not absolutely grounded, step 400 is executed. In this situation the wheel lift screening condition may stop checking the wheel lifting condition. Therefore, the wheel departure angle is continued or initiated in this step to provide some hysteresis in the wheel lifting detection.

Thus as can be seen, the roll signal for control may be adjusted according to the wheel lift/wheel grounded conditions.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling an automotive vehicle having a wheel comprising:
   determining an actual road torque applied to the wheel;
   determining a calculated road torque;
   generating a wheel lift signal in response to the calculated road torque and the actual road torque; and controlling a system of the automobile vehicle in response to the generated wheel lift signal.

2. A method as recited in claim 1 wherein determining an actual road torque comprises determining an actual road torque as a function of wheel acceleration.

3. A method as recited in claim 1 wherein determining an actual road torque comprises determining an actual road torque as a function of wheel acceleration and driving torque.

4. A method as recited in claim 1 wherein determining an actual road torque comprises determining an actual road torque as a function of wheel acceleration and braking torque.

5. A method as recited in claim 1 wherein determining an actual road torque comprises determining an actual road torque as a function of wheel acceleration, driving torque and braking torque.

6. A method as recited in claim 1 wherein determining a calculated road torque comprises determining a calculated road torque in response to normal loading.

7. A method as recited in claim 1 wherein determining a calculated road torque in response to normal loading comprises determining a heave normal load and a non-heave normal load, and determining a total normal load as a function of the heave normal load and non-heave normal load.

8. A method as recited in claim 1 wherein determining a calculated road torque comprises determining a calculated road torque in response to normal loading and longitudinal wheel slip.

* * * * *